United States Patent
Todoroki et al.

(10) Patent No.: US 9,193,219 B2
(45) Date of Patent: Nov. 24, 2015

(54) HEAVY-DUTY PNEUMATIC TIRE

(75) Inventors: Daisuke Todoroki, Kobe (JP); Atsushi Maehara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 140 days.

(21) Appl. No.: 13/816,528

(22) PCT Filed: Sep. 7, 2011

(86) PCT No.: PCT/JP2011/070350
§ 371 (c)(1),
(2), (4) Date: Feb. 12, 2013

(87) PCT Pub. No.: WO2012/033121
PCT Pub. Date: Mar. 15, 2012

(65) Prior Publication Data
US 2013/0139943 A1    Jun. 6, 2013

(30) Foreign Application Priority Data

Sep. 8, 2010  (JP) ................................. 2010-201181
Aug. 8, 2011  (JP) ................................. 2011-173202

(51) Int. Cl.
*B60C 15/00*  (2006.01)
*B60C 15/02*  (2006.01)
*B60C 15/04*  (2006.01)
(Continued)

(52) U.S. Cl.
CPC ............... *B60C 15/04* (2013.01); *B60C 15/024* (2013.01); *B60C 15/06* (2013.01); *B60C 2015/009* (2013.04); *B60C 2015/044* (2013.04); *B60C 2015/048* (2013.04); *B60C 2200/06* (2013.04); *Y10T 152/10819* (2015.01)

(58) Field of Classification Search
CPC ............ B60C 15/00; B60C 15/02; B60C 3/04
See application file for complete search history.

(56) References Cited

U.S. PATENT DOCUMENTS 4,721,144 A  *  1/1988  Hara et al. ..................... 152/541
2005/0045260 A1   3/2005  Maruoka et al.
2010/0089513 A1*  4/2010  Sasaki ........................... 152/541

FOREIGN PATENT DOCUMENTS

GB   1421435       *  1/1976
JP   11-129710 A      5/1999
JP   11-321248       * 11/1999
(Continued)

OTHER PUBLICATIONS

Machine translation of JP 11-321248, 1999.*

*Primary Examiner* — Justin Fischer
(74) *Attorney, Agent, or Firm* — Birch, Stewart, Kolasch & Birch, LLP

(57) ABSTRACT

A heavy-duty pneumatic tire includes a carcass including a carcass ply extending from a tread portion through a sidewall portion and turned up around a bead core of a bead portion. The bead core includes a radially inner surface extending along a bottom surface of the bead portion in the radial direction of the tire. Under both conditions that include an unloaded standard condition where the tire is mounted on a standard rim and inflated to regular internal pressure and a loaded standard condition where the tire in the unloaded standard condition above is loaded with a regular load and grounded at a camber angle of 0 degrees, the tire has an angle between the radially inner surface of the bead core and a rim sheet surface of the standard rim being in a range of 0 plus/minus 3 degrees.

20 Claims, 10 Drawing Sheets

(51) Int. Cl.
*B60C 15/06* (2006.01)
*B60C 15/024* (2006.01)

(56) References Cited

FOREIGN PATENT DOCUMENTS

| JP | 2000-16034 | A | | 1/2000 |
|----|------------|---|---|--------|
| JP | 2002-219913 | A | | 8/2002 |
| JP | 2004-189146 | | * | 7/2004 |
| JP | 2005-178668 | A | | 7/2005 |
| JP | 2005-186795 | A | | 7/2005 |
| JP | 2005-193868 | A | | 7/2005 |
| JP | 2009-137035 | A | | 6/2009 |

* cited by examiner

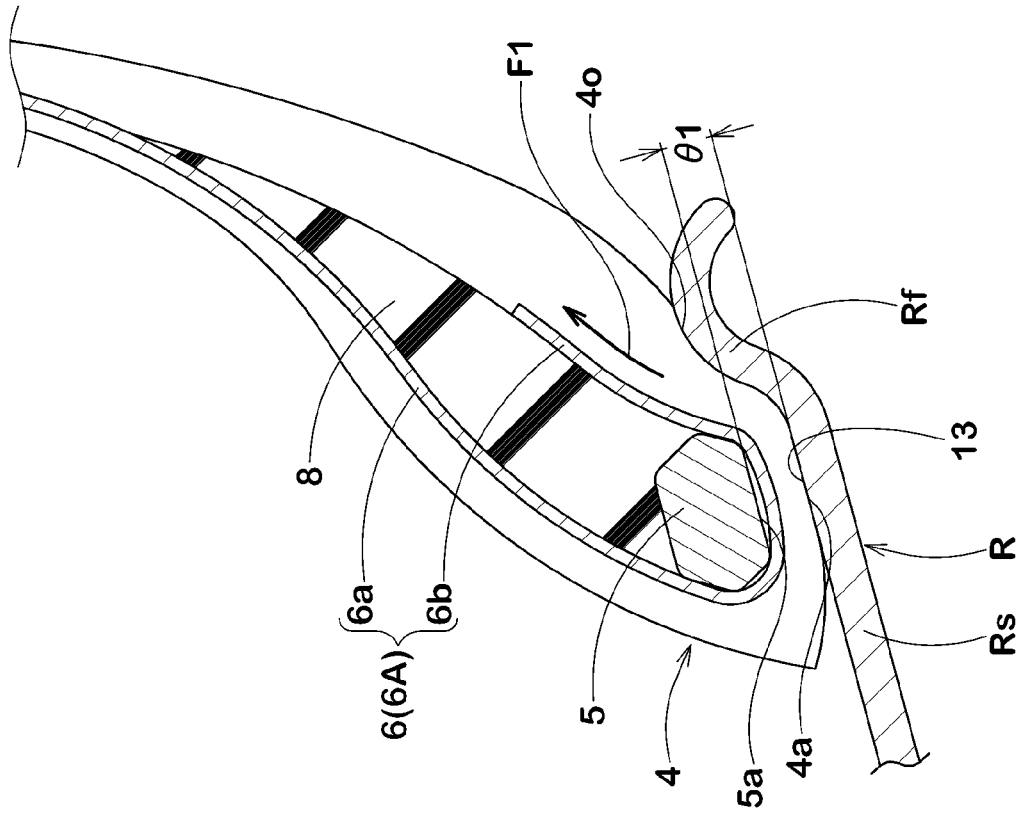
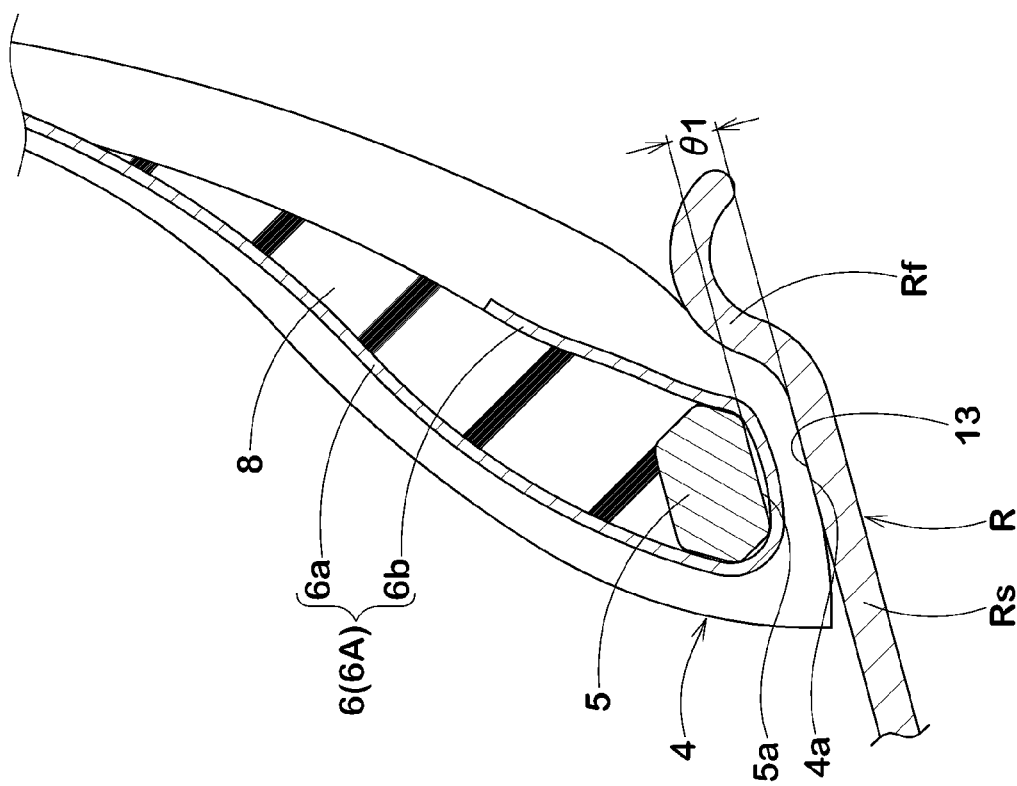

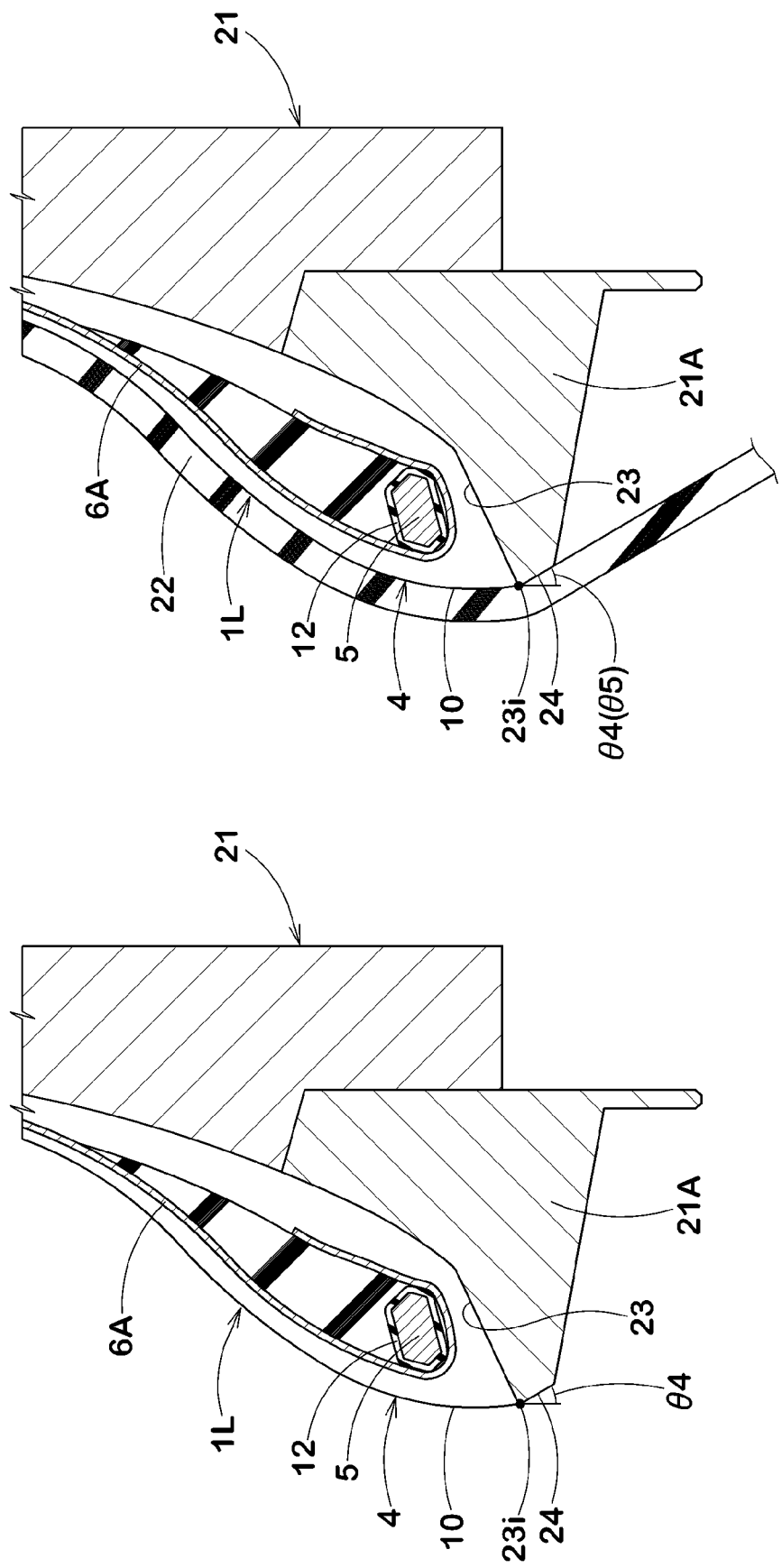

HEAVY-DUTY PNEUMATIC TIRE

TECHNICAL FIELD

The present invention relates to a heavy-duty pneumatic tire capable of improving bead durability and rolling resistance property.

BACKGROUND OF THE INVENTION

As shown in FIG. 10(*a*), in general, a traditional tubeless-type heavy-duty pneumatic tire (a) comprises a bead core (c) having a substantially hexagonal in cross-section disposed in a bead portion. Under a condition where the tire is mounted on standard rim (b) and is not yet inflated at an internal pressure (for example, a condition where the tire is reduced in the internal pressure to 5% of the regular internal pressure after inflating to the regular internal pressure), the radially inner surface c1 of the bead core (c) is designed to be substantially parallel to the rim sheet surface b1 of the rim (b), that is to say, to have an angle $\alpha 1$ of substantially 0 degrees between the radial inner surface c1 and a rim sheet surface b1. Accordingly, a fitting pressure between the bead core (c) and the rim (b) uniformly increases at below the bead core (c) so that bead durability and rolling resistance property are improved. An example of a related reference is as follows (see Patent Document 1).

Patent Document 1: Japanese unexamined Patent Application Publication No. 2009-137035.

DISCLOSURE OF THE INVENTION

Problems to be Solved by the Invention

However, as shown exaggeratedly in FIG. 10(*b*), when the heavy-duty pneumatic tire (a) is inflated to the internal pressure, a tension (f) of the carcass ply (d) is liable to turn out the bead core (c) in a clockwise fashion, and the angle $\alpha 1$ between a radially inner surface c1 and the rim sheet surface b1 becomes to have from about 3 to 5 degrees. Such a bead core (c) is apt to severely reduces the fitting pressure against the rim, especially the fitting pressure in toe-side of the bead portion. For this reason, in such a tire while running, the bead core (c) repeats a rotational displacement around the center of gravity in the cross section of the bead core (c) (hereinafter referred to as a "rotation" simply); and, there are problems to cause a deterioration of the bead durability owing to the heat generation and decrease of the rolling resistance property.

It is therefore, in view of these problems, an object of the present invention is to provide a heavy-duty pneumatic tire capable of improving the bead durability and the rolling resistance property on a basis of an inner surface of the bead core and a rim sheet surface of the standard rim being substantially parallel one another in both conditions that include: an unloaded standard condition where the tire is mounted on a standard rim and inflated to a regular internal pressure; and a loaded standard condition where the tire in the unloaded standard condition is loaded with a regular load and grounded at a camber angle of 0 degrees.

Means for Solving the Problem

In the invention of claim 1, a heavy-duty pneumatic tire comprises a carcass comprising a carcass ply extending from a tread portion through a sidewall portion and turned up around a bead core of a bead portion, wherein said bead core has a cross section having a substantially hexagonal shape including a radially inner surface extending along a bottom surface of said bead portion, and under two conditions that include: an unloaded standard condition where the tire is mounted on a standard rim and inflated to a regular internal pressure; and a loaded standard condition where the tire in the unloaded standard condition is loaded with a regular load and grounded at a camber angle of 0 degrees; an angle between said radially inner surface of said bead core and a rim sheet surface of said standard rim is in a range of 0 plus/minus 3 degrees.

In the invention of claim 2, the heavy-duty pneumatic tire as set forth in claim 1, wherein said hexagonal shape of said bead core has a center of gravity, said standard rim has a rim flange having a height and under the unloaded standard condition, a height from a bead base line to the center of gravity of said hexagonal shape of said bead core is in a range of from 0.40 to 0.85 times the height of the rim flange.

In the invention of claim 3, the heavy-duty pneumatic tire as set forth in claim 1 or 2, wherein under the unloaded standard condition, said bead core has a maximum width CW measured in parallel with said rim sheet surface, a maximum thickness AW measured at right angles to the maximum width, and a ratio AW/CW of the maximum thickness to the maximum width of from 0.2 to 0.7.

In the invention of claim 4, the heavy-duty pneumatic tire as set forth in any one of claims 1 to 3, wherein said bead portion comprises a bead apex rubber extending and tapering outwardly in a radial direction of the tire from a radially outer surface of said bead core, and the bead apex rubber has a complex modulus E*1 in a range of from 60 to 80 MPa.

In the invention of claim 5, under the unloaded standard condition, a ratio H/G between a tire axial distance H from an axially inner end of the bead core to a bead heal point and a tire axial width G of the bottom surface of the bead portion is in a range of from 0.60 to 0.94.

In the invention of claim 6, under the unloaded standard condition, a ratio CW/G between a maximum width CW of the bead core and a tire axial width G of the bottom surface of the bead portion is in a range of from 0.50 to 0.85.

In the invention of claim 7, the heavy-duty pneumatic tire as set forth in any one of claims 1 to 6, wherein under an unloaded condition where the tire is mounted on the standard rim and inflated to 5% of the regular internal pressure, said radially inner surface of the bead core has an angle $\alpha c$ with respect to a tire axial-directional line being larger than an angle $\alpha r$ of said rim sheet surface with respect to a tire axial-directional line, and a difference between the angle $\alpha c$ and the angle $\alpha r$ is in a range of from 2 to 8 degrees.

In the invention of claim 8, the heavy-duty pneumatic tire as set forth in any one of claims 1 to 7, wherein a wrapping layer is provided around the bead core, and said wrapping layer is made of a rubber having a complex modulus E*3 of from 6 to 11 MPa.

In the invention of claim 9, said carcass ply includes a main portion extending from the tread portion through the sidewall portion to said bead core of the bead portion and a turn-up portion turned up around the bead core from the axially inside to the axially outside of the tire, said bead portion comprises a bead reinforcing layer having a substantially L-shaped cross-section which includes an outer portion extending along an axial outer surface of said turn-up portion of the carcass ply and a bottom portion extending along the radially inner surface of the bead core and having an axially inner end, and under the unloaded standard condition, the axially inner end of the bottom portion is located in a tire axial distance from a bead heal point of the bead portion in a range of from 10 to 25 mm.

In the invention of claim 10, the heavy-duty pneumatic tire as set forth in claim 9, wherein under the unloaded standard condition, the outer portion has a radially outer end having a height from a bead base line of from 0.12 to 0.25 times a tire section height.

Effect of the Invention

In both of an unloaded standard condition where the tire is mounted on a standard rim and inflated to a regular internal pressure and a loaded standard condition where the tire in this unloaded standard condition is loaded with a regular load and grounded at a camber angle of 0 degrees, the tire has an angle between the inner surface of the bead core and a rim sheet surface of the standard rim limited to a range of 0 plus/minus 3 degrees.

The heavy-duty pneumatic tire may maintain a fitting pressure of the bead portion against the rim widely and greatly, in both of the unloaded standard condition and the loaded standard condition. Therefore, the heavy-duty pneumatic tire of the present invention may prevent the rotation of the bead core during traveling, and thereby the bead durability and the rolling resistance property of the tire are improved.

BRIEF EXPLANATION OF THE DRAWING

FIG. 3(*a*) a cross-sectional partial view showing the heavy-duty pneumatic tire under an unloaded standard condition, and FIG. 3(*b*) is a cross-sectional partial view showing the heavy-duty pneumatic tire under the loaded standard condition.

FIG. 7(*a*) is a cross-sectional view of a bead ring on which a green tire is set, and FIG. 7(*b*) is a cross-sectional view explaining a vulcanization process.

EXPLANATION OF THE REFERENCE

2 Tread portion
3 Sidewall portion
4 Bead portion
5 Bead core
6 Carcass
6A Carcass ply
R standard rim

BEST MODE FOR CARRYING OUT THE INVENTION

Hereinafter, an embodiment of the present invention will be described with referent to the drawings.

Figure 1:
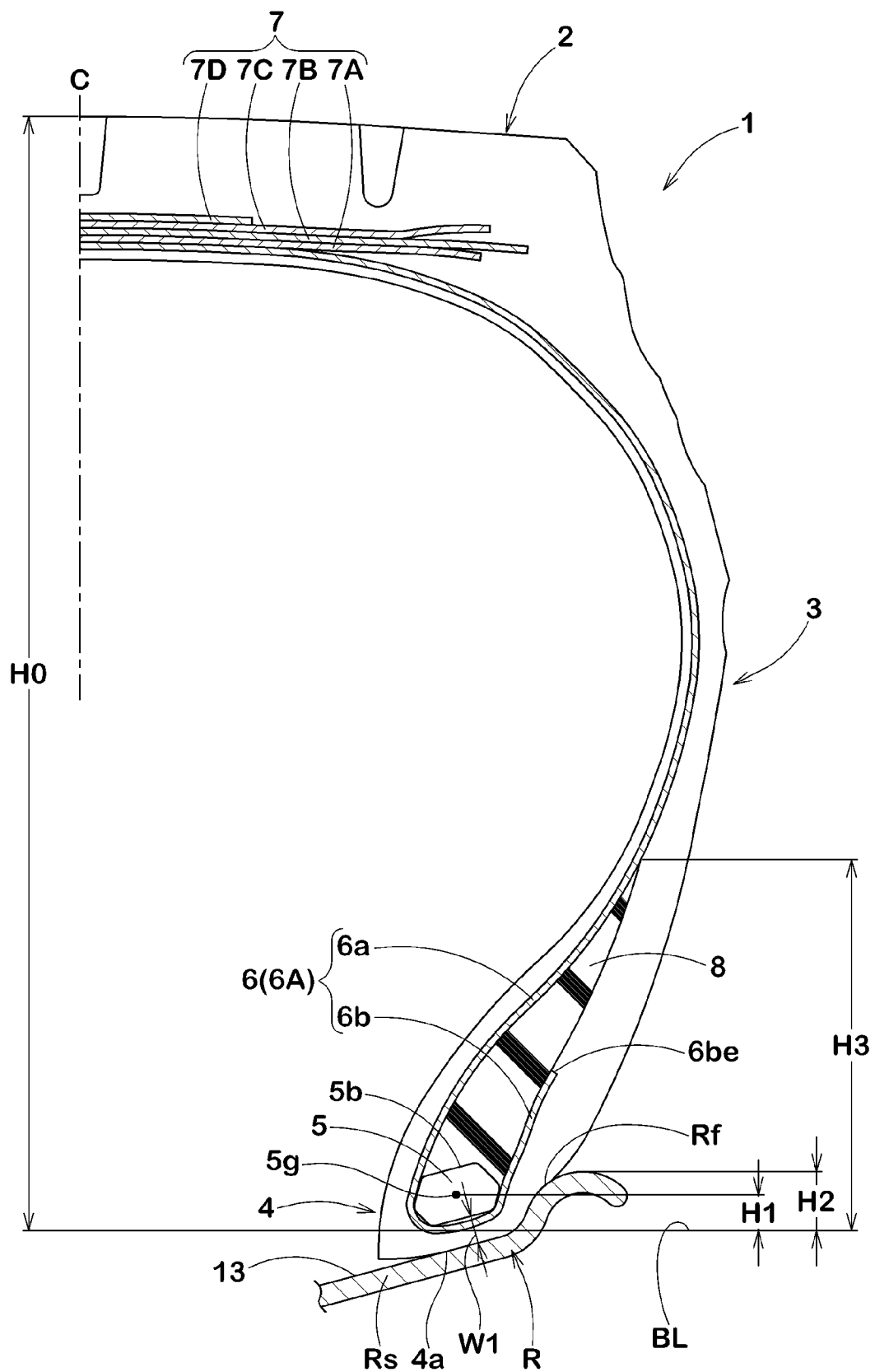
FIG. 1 is a cross-sectional view of a heavy-duty pneumatic tire under an unloaded standard condition of the present embodiment.

FIG. 1 is a right-side cross-sectional view showing an assembly of a heavy-duty pneumatic tire 1 (hereinafter referred to as a "tire" simply) under an unloaded standard condition where the tire mounted on a standard rim R and having a regular internal pressure with a standard rim R. Unless otherwise stated, a dimension and the like of each part of the tire are determined as values measured in the above-mentioned unloaded standard condition.

The "standard rim" is a wheel rim determined for each tire by a standard including one on which the tire is based. For example, the standard rim is a "Normal rim" in the case of JATMA, a "Design Rim" in the case of TRA, and a "Measuring Rim" in the case of ETRTO.

The "regular internal pressure" means an air pressure determined for each tire by the standard. For example, the regular internal pressure is the maximum air pressure in JATMA, the maximum value described in a table "TIRE LOAD LIMITS AT VARIOUS COLD INFLATION PRESSURES" in the case Of TRA, and the "INFLATION PRESSURE" in the case of ETRTO.

The tire 1 illustrated as a tubeless-type comprises a toroidal carcass 6 extending from a tread portion 2 through a sidewall portion 3 to the bead core 5 of a bead portion 4 and a belt layer 7 disposed on the radially outside of this carcass 6 and on the inside of the tread portion 2.

The carcass 6 comprises at least one carcass ply 6A (a single carcass ply 6A in the present embodiment) comprising a main portion 6*a* extending from the tread portion 2 through the sidewall portion 3 to the bead core 5 of the bead portion 4, and a turn-up portion 6*b* extending from this main portion 6*a* and turned up around the bead core 5 from the axially inside to the axially outside of the tire.

The carcass ply 6A is made of a cord ply of carcass cords arranged in parallel one another and covered with a topping rubber. The carcass cord is arranged at an angle of from 70 to 90 degrees with respect to the tire equator c. As the carcass cord, a steel cord is preferably employed.

The above-mentioned belt layer 7 comprises four layers which includes the innermost belt ply 7A of belt cords arranged at an angle of about 60 plus/minus 10 degrees with respect to the tire equator C and belt plies 7B, 7C and 7D each with belt cords arranged at an angle of from 15 to 35 degrees with respect to the tire equator C, for example. As the belt cord, steel cord is employed. The belt layer 7 may solidly reinforce the substantially overall width of the tread portion 2. Moreover, the belt layer 7 includes at least two belt plies crossing each other so as to improve the rigidity in belt layer.

Figure 2:
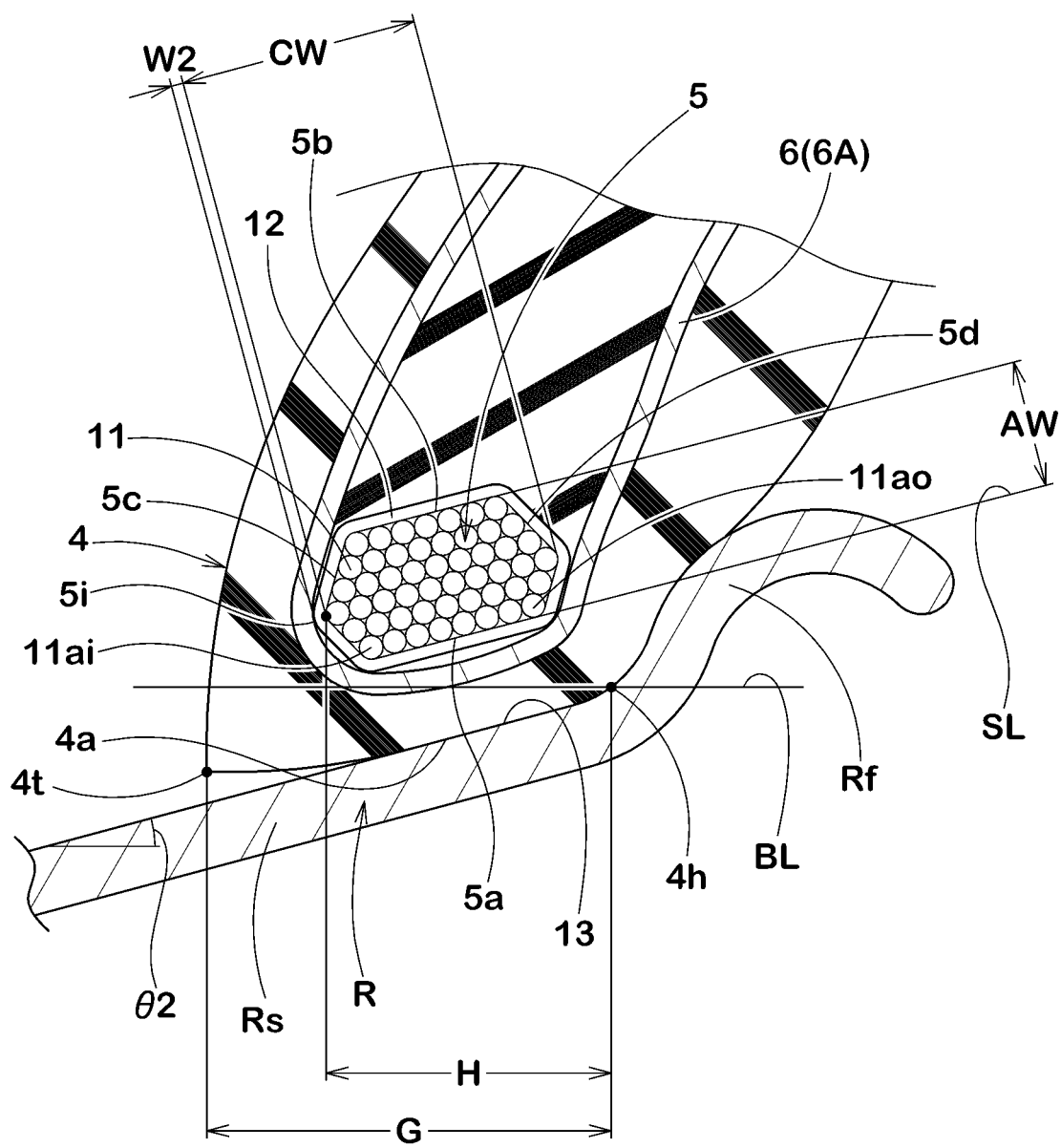
FIG. 2 is a cross-sectional view showing the bead portion of FIG. 1.

As shown in FIG. 2 in closeup, the bead core 5 has a substantially hexagonal shape in cross-section which is formed by winding a bead wire 11 with a round shape in cross-section, continuously, for example. As the bead wire 11, steel cord is employed. Incidentally, the bead core 5 may have a monolithic structure.

Moreover, the bead core 5 of the present embodiment comprises a radially inner surface 5*a* extending along the bottom surface 4*a* of the bead portion 4, a radially outer surface 5*b* facing the radially inner surface 5*a*, an axial inner surface 5*c* connecting in the inner side of them above curving in projecting axially inside, and an axial outer surface 5*d* connecting in the outer side of the radially inner surface 5*a* with the radially outer surface 5b and curving in projecting axially outside. The bead core 5 is formed to be a substantially flattened hexagonal shape in cross section. The bead core 5 excels in the configuration stability and can improve the bead durability.

The bottom surface 4a of the bead portion 4 represents a region from a bead toe 4t which is the axially innermost end of the bead portion to a bead heal point 4h which is the axially outmost end of the bead portion 4. Under the unloaded standard condition, the bead heal point 4h is defined as an intersection point with a bead base line BL of a tire axial-directional line passing through the diameter of the rim.

The standard rim R of the present embodiment comprises a rim sheet Rs receiving the bottom surface 4a of the bead portion 4 and a rim flange Rf protruding from the axially outer end of the rim sheet Rs to the radially outside while smoothly curving to the axially outside of the tire.

The rim R is a 15-degrees tapered rim having the rim sheet Rs inclined at an angle θ2 of substantially 15 degrees with respect to the tire axial direction from the axially inside to the outside of the tire. Incidentally, the "substantially 15 degrees" includes a margin for manufacturing error, and it may be in a range of 15 plus/minus 1 degrees.

The tire 1 of the present embodiment has an angle θ1 between the radially inner surface 5a of the bead core 5 and the rim sheet surface 13 forming an outer surface of the rim sheet Rs being in a range of 0 plus/minus 3 degrees under two conditions that include the unloaded standard condition (shown in FIG. 3(a)) and a loaded standard condition where the tire in the unloaded standard condition is loaded with a regular load and grounded at a camber angle of 0 degrees (shown in FIG. 3(b)).

The "regular load" is a load determined for each tire by the standard. For example, the regular load means the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO.

As shown in FIG. 2, when the bead core 5 is formed of a winding body of the bead wire 11, an inclination of the radially inner surface 5a of the bead core 5 is defined with a common tangent SL passing through each outer surface of the bead wires 11 arranged on the radially inner surface 5a in the cross section. When the common tangent SL cannot be drawn, for the sake of expedience, the common tangent SL is defined as a tangent bordering upon an axially innermost bead wire 11ai and an axially outermost bead wire 11ao among the bead wires 11 arranged on the radially inner surface 5a in the cross section.

The tire 1 of the present may maintain widely and greatly the fitting pressure against the bead portion 4 in both of the unloaded standard condition and the loaded standard condition. Therefore, the tire 1 of the present invention may prevent the rotation of the bead core 5 during running, and thereby the heat generation of the bead portion 4 can be reduced, and the bead durability and rolling resistance property can be improved.

Although the conventional heavy-duty tire had an angle θ1 between the radially inner surface 5a of the bead core 5 and the rim sheet surface 13 being in a range of 0 plus/minus 3 degrees under the unloaded standard condition, the angle θ1 was not kept in a range of 0 plus/minus 3 degrees under the loaded standard condition due to the rotation of the bead core.

Figure 4A:
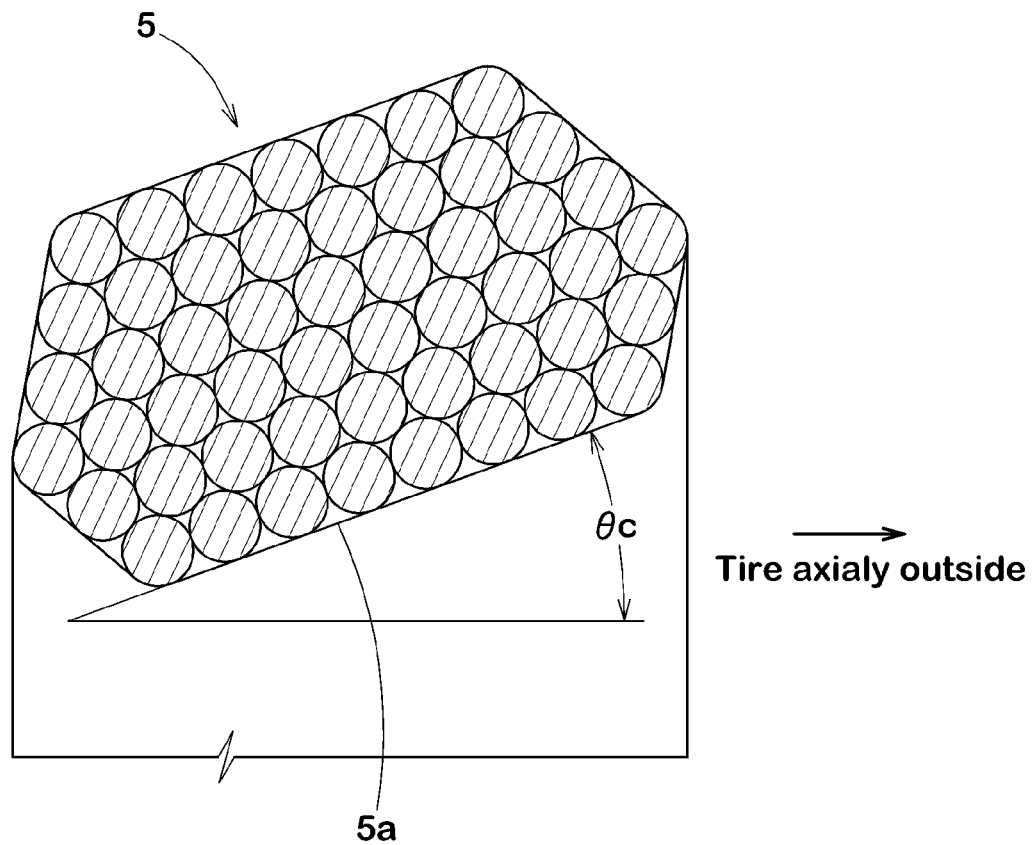
FIG. 4(*a*) is a cross-sectional view showing the enlarged bead core, and FIG. 4(*b*) is a cross-sectional view of the bead portion in a free condition of the tire.

However, from various experiments and analysis by the inventor of the present invention, as shown in FIG. 4(a), it was found out that the angle θ1 may be maintained 0 plus/minus 3 degrees under both conditions including the unloaded standard condition and the loaded standard condition, when the bead core 5 has an angle θc of the radially inner surface 5a with respect to the tire axial directional that is opened toward the axially outside and is set in a range of 20 plus/minus 2 degrees, preferably in a range of 20 plus/minus 1 degrees, more preferably, 20 degrees, during forming thereof.

Figure 4B:
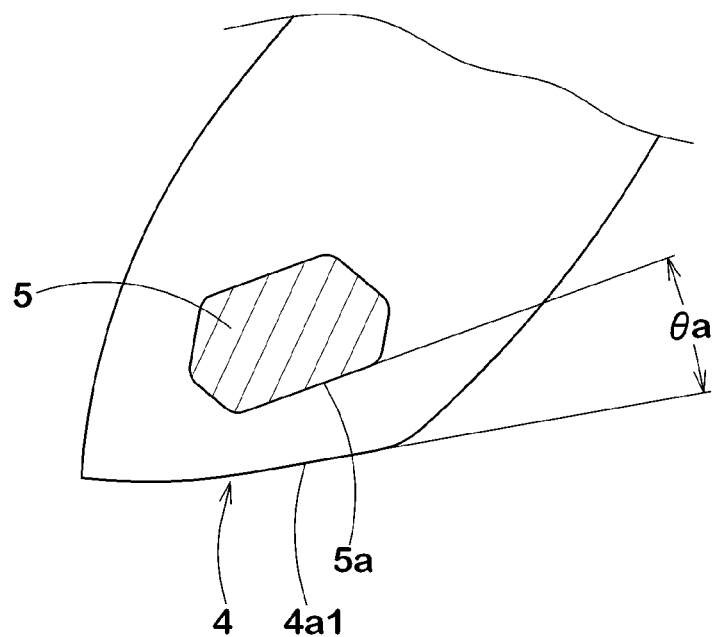

In addition to the angle θc of the inner surface of the bead core, as shown in FIG. 4(b), in a free condition of the tire that the tire is not mounted on the rim, an angle θa between the radially inner surface 5a of the bead core 5 and an inward portion 4a1 under the bead core 5 on the bottom surface 4a of the bead portion 4 is preferably not less than 0 degrees more preferably not less than 3 degrees. And it is also important to set preferably the angle θa of not more than 10 degrees, more preferably not more than 7 degrees.

Figure 5:
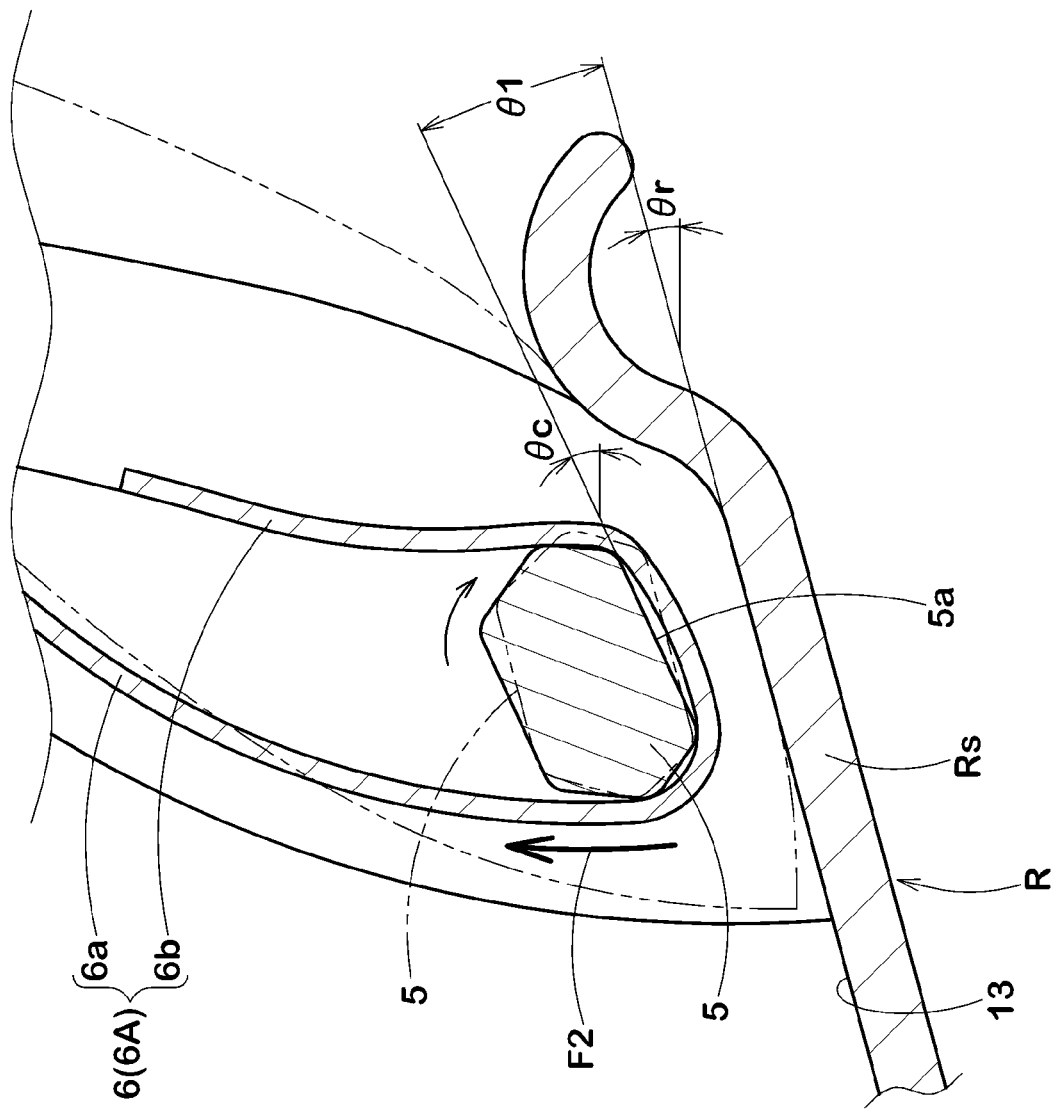
FIG. 5 is a cross-sectional view showing the bead portion of the heavy-duty pneumatic tire in the unloaded condition where the tire is inflated a regular internal pressure of 5% and in the unloaded standard condition.

As mentioned above, the tire 1 comprising the bead core 5 comprising the radially inner surface 5a having the angle θc of 20 plus/minus 2 degrees, as shown in FIG. 5 with a solid line, may have the angle θc of the radially inner surface 5a of the bead core 5 with respect to the tire axial direction larger than the angle θr of the rim sheet surface 13 of the standard rim R with respect to the tire axial direction under an unloaded condition where the tire is mounted on the standard rim R and inflated at the internal pressure of 5% of the regular internal pressure (obtained by inflating the regular internal pressure into the tire and reducing the internal pressure to 5% of the regular internal pressure).

For this reason, an angle θ1 (θc-θr) between the radially inner surface 5a of the bead core 5 and the rim sheet surface 13 is preferably in a range of about 5 plus/minus 3 degrees, more preferably in a range of about 5 plus/minus 2 degrees. Meanwhile, for the above-mentioned angle θc and angle θr in the present description, an inclination being open axially outwardly is a positive sense.

After inflating the tire to the regular internal pressure, as shown in FIG. 5 with a virtual line, the bead core 5 rotates in a clockwise fashion in the drawing due to a tension F2 of the carcass ply 6A toward the tire radial outward direction. Therefore, the angle θc of the radially inner surface 5a of the bead core 5 becomes small, and thereby the angle θ1 with respect to the rim sheet surface 13 changes in a range of 0 plus/minus 3 degrees, preferably in a range of 0 plus/minus 2 degrees, much more preferably in a range of 0 plus/minus 1 degrees.

Moreover, the tire 1 of the present embodiment may maintain the above-mentioned angle θ1 without substantial change even if loading the regular load on the tire in the unloaded standard condition.

It needs further analysis why the angle θ1 can be within the range of 0 plus/minus 3 degrees in both of the unloaded standard condition and the loaded standard condition in the case of using the above-mentioned bead core 5. However, one possible cause is that the region which receives a high fitting pressure of the bottom surface 4a of the bead portion 4 from the rim sheet surface 13 expands.

Figure 6A:
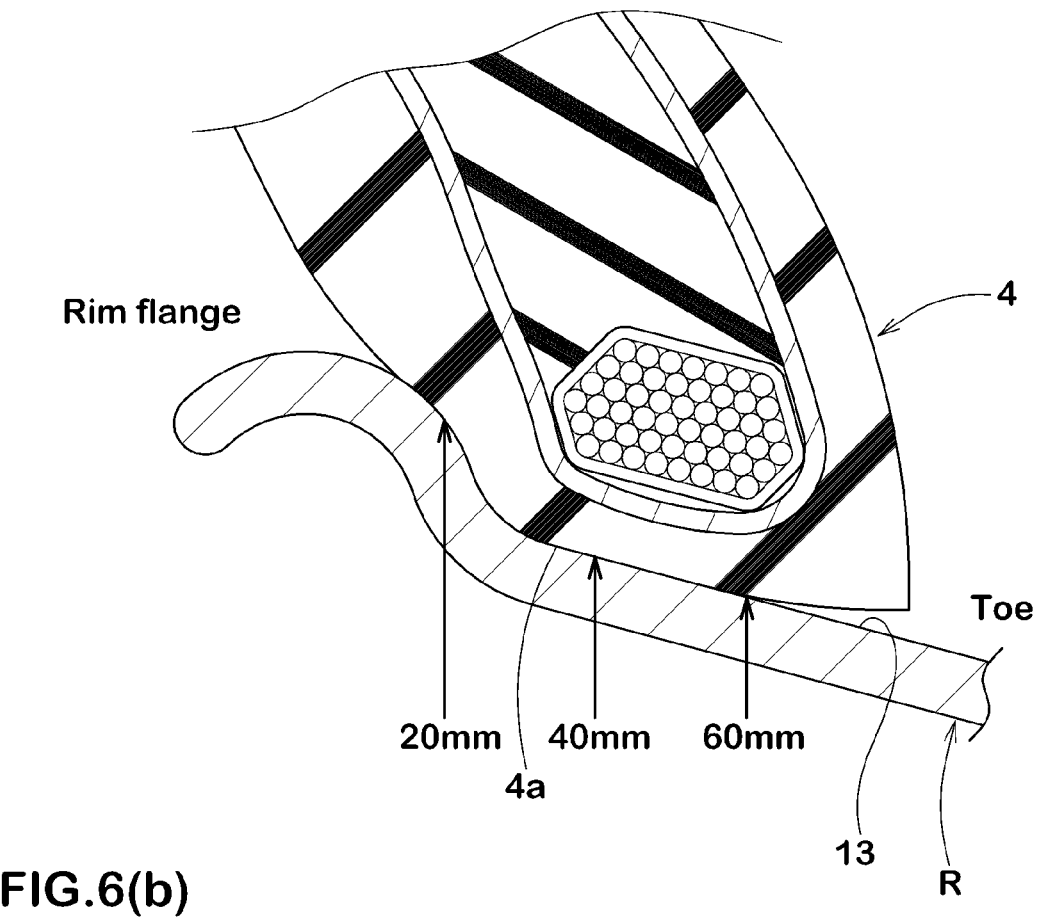
FIG. 6(*a*) is a cross-sectional view showing a position of a contact region between the bead portion and the rim, and FIG. 6(*b*) is a graph showing a fitting pressure of the contact region of FIG. 6(*a*).
Figure 6B:
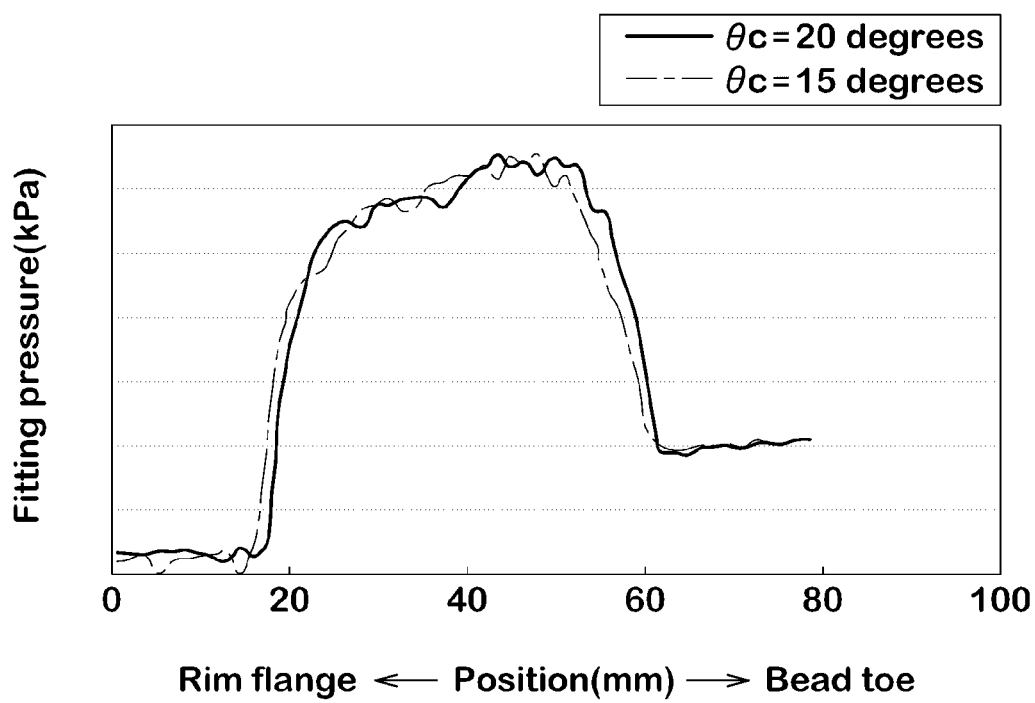

FIGS. 6(a) and 6(b) show measurement results of each fitting pressure (contact pressure) of the bead portion 4 with the standard rim R in the unloaded standard condition in use of a heavy-duty tire (11R22.5) comprising the inner surface of the bead core having the above-mentioned angle θc of 15 degrees (comparative Example) and of 20 degrees (Example). In FIG. 6(b), the fitting pressure (contacting pressure) is located on the ordinate. And, a position of the contact region of the bead portion 4 with the standard rim R shown in FIG. 6(a) is located on the abscissa; and the larger the numerical value is, the axially insider (the near the bead toe) the position is located.

Also, the fitting pressure is measured with a surface pressure distribution measuring system I-SCAN (manufactured by NITTA CORPORATION) in the above-mentioned unloaded standard condition. As is clear from FIG. 6(b), in the tire of the present embodiment, a high tire fitting pressure extends widely; in particular, it extends toward the bead toe 4t. It is speculated that such a distribution change of the fitting pressure makes a contribution to the maintenance of the angle θ1.

That is to say, in the loaded standard condition, as shown in FIG. 3(b), the sidewall portion 3 deflects toward axially outside of the tire, and the rubber portion 4o disposed axially outside the turn-up portion 6b in the bead portion 4 is pressed by the rim flange Rf toward radial outside of the tire. Moreover, the turn-up portion 6b of the carcass ply 6A is pulled up to the radially outside of the tire with the deformed rubber portion 4o so that a tensile force F1 to rotate the bead core 5 in a counterclockwise fashion in the drawing arises.

Since the tire of the present embodiment has an enhanced fitting pressure between the bottom surface 4a of the bead portion and the rim sheet surface 13 that widely expands toward the bead toe 4t, the rotation of the bead core may be prevented against the tensile force F1 of the carcass ply 6A.

In this way, the bead core 5 of the tire 1 in the present embodiment can exert a great fitting against the standard rim R in both of the unloaded standard condition and the loaded standard condition, and the rotation can be prevented also while traveling of the tire. Therefore, the tire 1 may prevent the rotation of the bead core 5, prevent the movement of the bead portion 4, prevent the damage and energy loss of the bead portion 4, and improve the bead durability and the rolling resistance property.

To improve the above-mentioned function more effectively, the above-mentioned angle θ1 is preferably in a range of 0 plus/minus 2 degrees, more preferably in a range of 0 plus/minus 1 degrees, much more preferably in a range of 0 degrees under both of the unloaded standard condition and the loaded standard condition.

As shown in FIG. 1, under the unloaded standard condition, a height H1 of the center of gravity 5g (center of gravity in cross-section) of the bead core 5 from the bead base line BL can be arbitrarily set. When the height H1 is too small, a rubber thickness w1 between the bead core 5 and the standard rim R is insufficient, and cracks may possibly arise in the bottom surface 4a of the bead portion 4 and the like. When the height H1 is too large, the high fitting pressure against the standard rim R may not be maintained, and troubles such a tire drop-off from the rim and the like more likely occur. From the viewpoint of this, the height H1 is preferably not less than 0.40 times, more preferably not less than 0.5 times, much more preferably not less than 0.55 times the height H2 of the rim flange Rf; and is preferably not more than 0.85 times, more preferably not more than 0.75 times, much more preferably not more than 0.70 times the height H2.

As shown in FIG. 2, under the unloaded standard condition, when a ratio (AW/CW) between the maximum width CW of the bead core 5 and the maximum thickness AW at a right angle to this maximum width CW is small, the rigidity of the bead core 5 tends to decrease. When the ratio (AW/CW) is large, it may be difficult to enhance the fitting pressure between the bottom surface 4a of the bead portion 4 and the rim sheet surface 13 widely. From the viewpoint of this, the ratio (AW/CW) is preferably not less than 0.2, more preferably not less than 0.30, much more preferably not less than 0.40; and is preferably not more than 0.7, more preferably not more than 0.65, much more preferably not more than 0.60.

Moreover, under the unloaded standard condition, a ratio (H/G) between an axial distance H from the axially inner end 5i of the bead core 5 to the bead heal point 4h and an axial width G of the bead bottom 4a of the bead portion 4 is small, the rubber volume on the side of the bead toe 4t becomes excessively large and may possibly decrease the bead durability. When the ratio (H/G) is large, the rubber volume on the side of the bead toe 4t becomes excessively small and may possibly cause troubles such as the cracks. From the viewpoint of this, the ratio (H/G) is preferably not less than 0.60, more preferably not less than 0.70; and is preferably not more than 0.94, more preferably not more than 0.85.

In the same sense, a ratio (CW/G) between the maximum width CW of the bead core 5 and the axial width G of the bottom surface 4a of the bead portion 4 is preferably not less than 0.50, more preferably not less than 0.60; and is preferably not more than 0.85, more preferably not more than 0.75.

The above-mentioned bead core 5 is preferably provided with a wrapping layer 12 surrounding its outer circumference. This wrapping layer 12 may prevent the bead wire 11 from separation. Moreover, the wrapping layer 12 may prevent to contact the carcass cord of the carcass ply 6A with the bead core 5 so that the bead durability is improved.

The wrapping layer 12 is preferably made of a high elastic rubber having a complex modulus E*3 of from 6 to 11 MPa. Such a wrapping layer 12 can prevent the rubber thickness W2 between the bead core 5 and the carcass ply 6A from becoming reduced in size with a flow of the rubber in vulcanization.

The complex modulus E*3 is a volume measured with a viscoelastic spectrometer manufactured by Iwamoto Seisakusho according as provision of JIS-K6394 under the following condition:
  Initial strain: 10%
  Amplitude: plus/minus 1%
  Frequency: 10 Hz
  Deformation mode: Tension
  Measured temperature: 70 degrees C.

Therefore, the tire 1 of the present embodiment may further improve the bead durability by preventing damage in rubber due to friction between the bead core 5 and the carcass ply 6A. Moreover, since the rubber thickness W2 can be maintained without enlarging the thickness of the wrapping layer 12, an increase of the tire mass can be prevented.

When the complex modulus E*3 of the wrapping layer 12 is less than 6 MPa, the wrapping layer 12 softens excessively, and the rubber thickness W2 may not be possibly maintained. When the complex modulus E*3 is over 11 MPa, the wrapping layer 12 hardens excessively, and the wrapping layer 12 may not be easily wound around the bead core 5. From the viewpoint of this, the complex modulus E*3 is preferably not less than 7 MPa, more preferably, not more than 10 MPa.

As shown in FIG. 1, the bead portion 4 is preferably provided with a bead apex rubber 8 extending and tapering from the radially outer surface 5b of the bead core 5 outwardly in the radial direction of the tire. Such a bead apex rubber 8 may increase the bending rigidity of bead portion 4 and may improve more the bead durability and the rolling resistance property.

The complex modulus E*1 of the bead apex rubber 8 is not particularly limited. When the complex modulus E*1, however, is too small, the bending rigidity of the bead portion 4 may possibly not be enhanced sufficiently. When the complex modulus E*1 is too large, the bending rigidity of the bead portion 4 excessively mounts, and a strain possibly concentrates upon the outer end 6be of the turn-up portion 6b of the carcass ply 6A and the like. From the viewpoint of this, the complex modulus $E^*1$ is preferably not less than 60 MPa, more preferably not less than 65 MPa; and preferably not more than 80 MPa, more preferably not more than 75 MPa.

Under the unloaded standard condition, when a radial length H3 of the bead apex rubber 8 from the bead base line BL is too small, the bending rigidity of bead portion 4 may possibly not be sufficiently enhanced. When the length H3 is too large, the bending rigidity of the bead portion 4 may possibly be enhanced excessively. From the viewpoint of this, the length is preferably not less than 0.20 times, more preferably not less than 0.30 times; and preferably not more than 0.50 times, more preferably not more than 0.40 times the tire section height H0.

As shown in FIGS. 7(a) and 7(b), the present embodiment tire 1 is manufactured through a vulcanization process by use of a vulcanization mold 21 having a bead ring 21A with a bead molded surface 23 and a balloon-like bladder 22 for pushing a raw cover 1L onto the side of a molded surface of the vulcanization mold 21.

As shown in FIG. 7(a), the bead ring 21A of the present embodiment comprises the bead molded surface 23, and a bladder contact surface 24 extending from the axially inner end 23i of the bead molded surface 23 to the radially inside of the tire so that the bladder 22 is contacted and held thereon. The bladder contact surface 24 has an inclination extending from the inner end 23i of the bead-molded surface 23 to the radially inside and the axially outside of the tire. Moreover, an angle θ4 of the bladder contact surface 24 with respect to the tire radial direction is preferably set in a range of from 20 to 40 degrees; conventionally, this angle θ4 is ordinarily 0 degrees.

As shown in FIG. 7(b), such a bead ring 21A may increase an incidence angle θ5 of the bladder 22 at the inner end 23i of the bead molded surface 23 can enlarge. Therefore, the bladder 22 largely curves convexly in the tire axial direction at the inner end 23i, and the pressure onto the tire cavity surface 10 of the bead portion 4 is more weakened than ever before. Therefore, it helps to prevent a size-down of the rubber thickness W2 (shown in FIG. 2) between the bead core 5 and the carcass ply 6A caused by a deep pressure of the bladder 22, and the bead durability can be improved.

When the angle θ4 of the bladder contact surface 24 is less than 20 degrees, the pressure of the bladder 22 may possibly not be weakened sufficiently. When the angle θ4 is over 40 degrees, the pressure of the bladder 22 excessively becomes reduced in size, and molding defective such as an air stay may possibly occur in the bead portion 4. From the viewpoint of this, the angle θ4 is preferably not less than 25 degrees, more preferably not more than 35 degrees.

Figure 8:
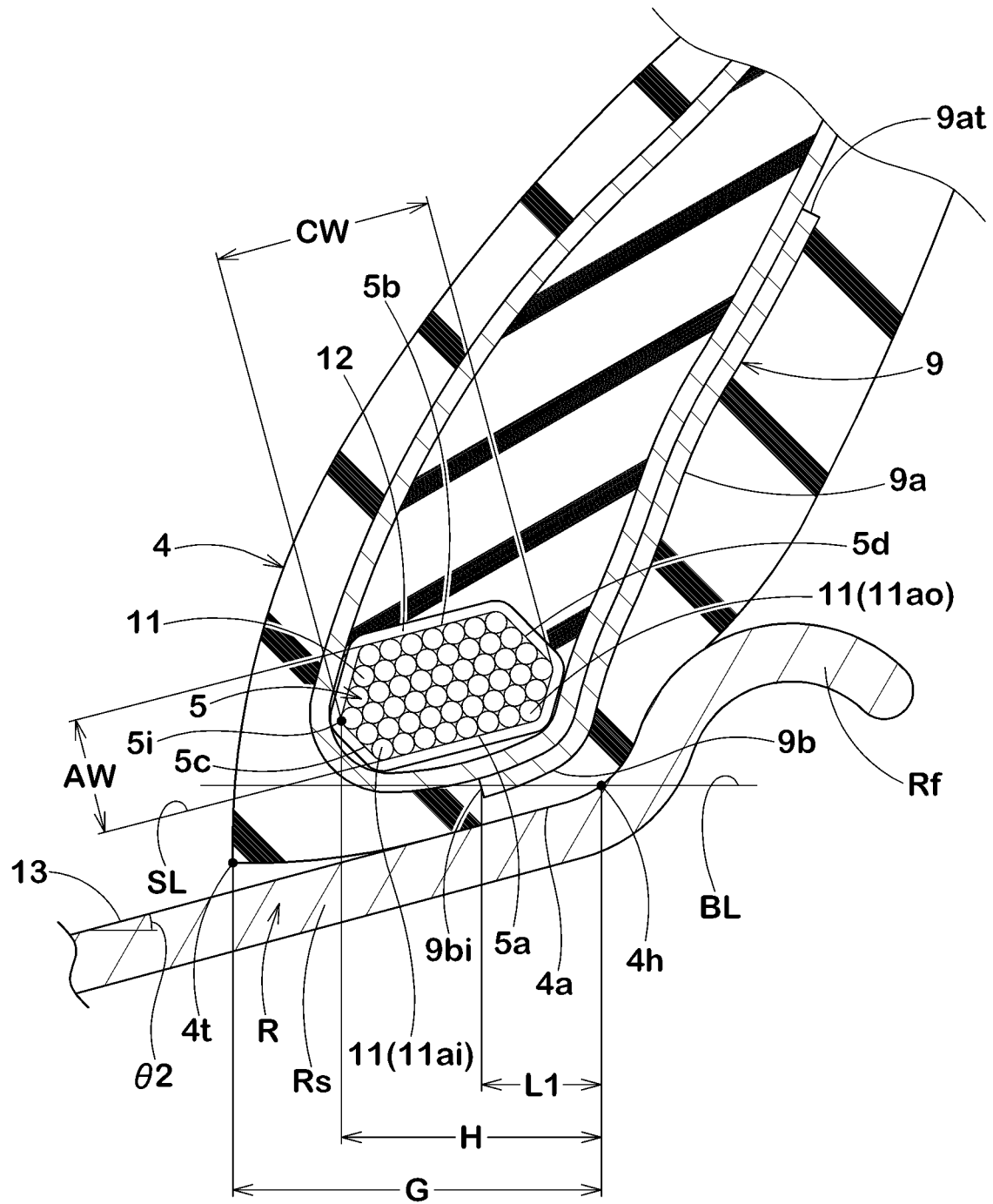
FIG. 8 is an enlarged view of another embodiment of the bead portion.
Figure 9:
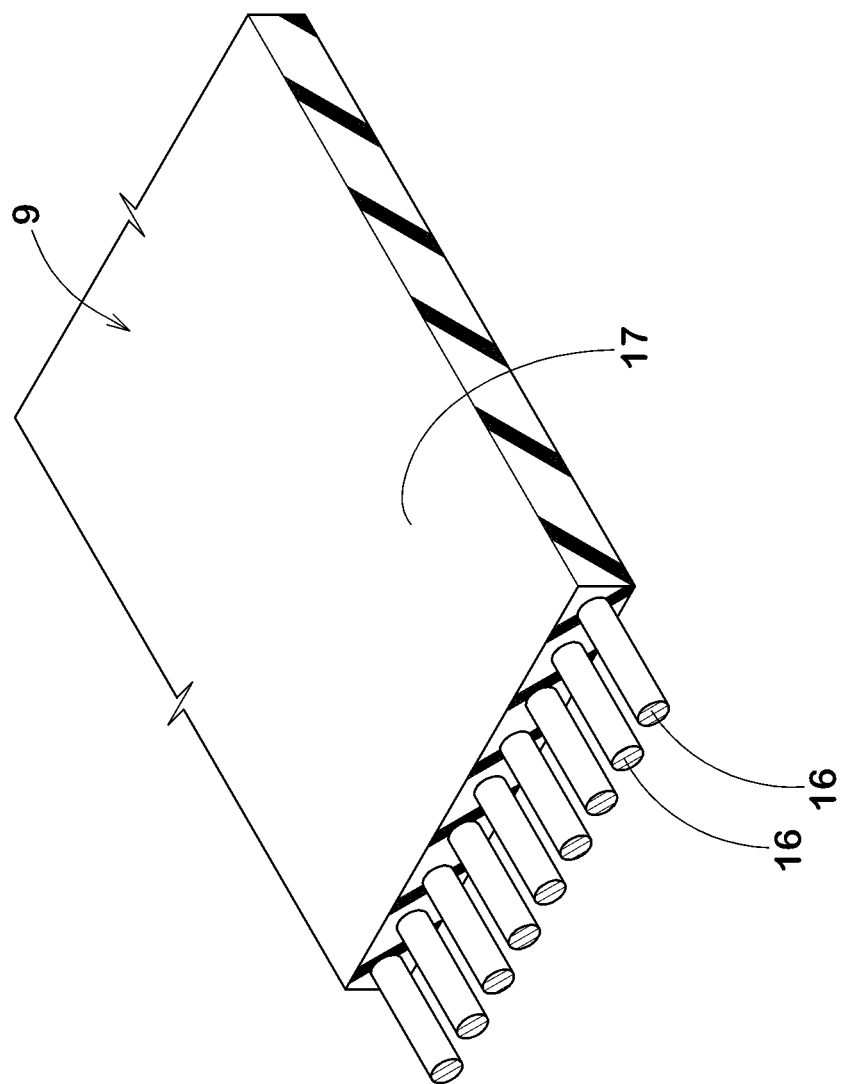
FIG. 9 is a diagrammatic perspective view of the bead reinforcing layer.
Figure 10A:
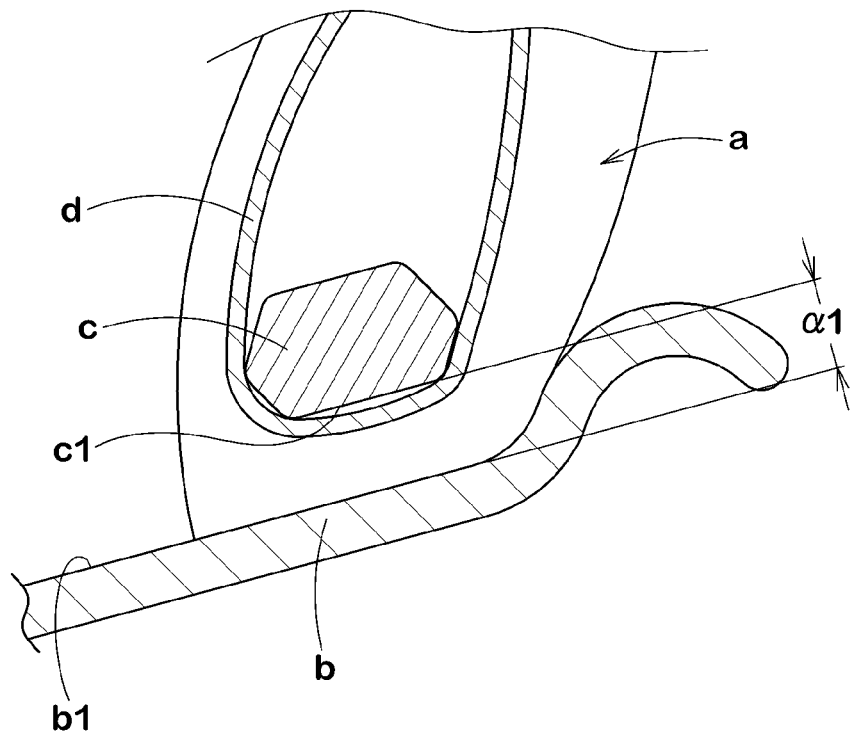
FIG. 10(*a*) is across-sectional view of the bead portion of a conventional heavy-duty pneumatic tire before an inflation of an internal pressure, and FIG. 10(*b*) is a cross-sectional view after the inflation of this internal pressure.
Figure 10B:
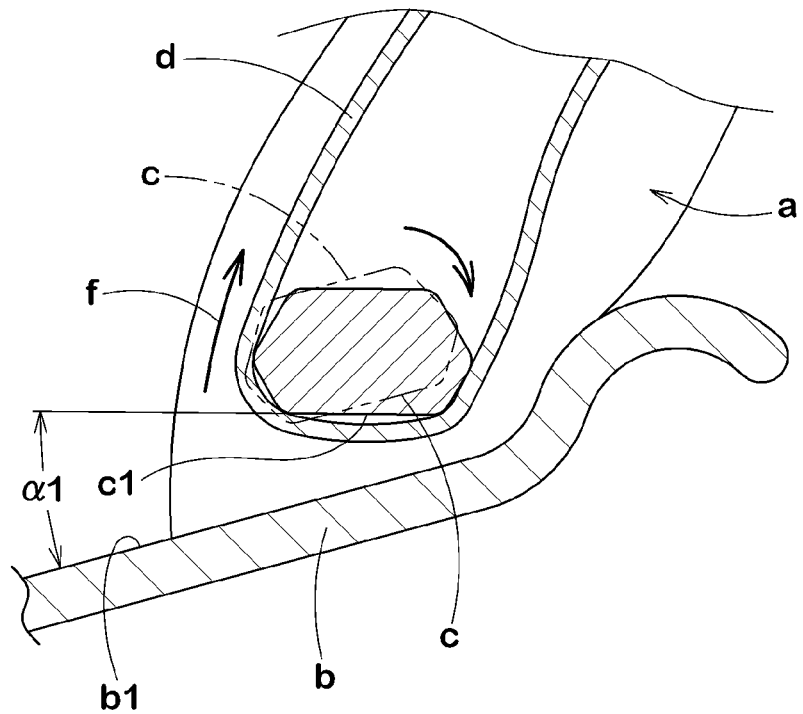

Moreover, FIG. 8 shows another embodiment of the tire 1 of the present invention. The tire 1 of this embodiment is provided with a bead reinforcing layer 9 in a bead portion 4. As shown in FIG. 9, this bead reinforcing layer 9 is formed by covering an arrangement body of the bead reinforce cord 16 arranged at an angle θ3 of from 20 to 30 degrees with respect to the tire circumferential direction with a topping rubber 17. Moreover, as the bead reinforce cord 16, a steel cord is employed.

Such a bead reinforcing layer 9 may increase the bending rigidity of bead portion 4 in concert with the bead apex rubber 8, and improve the steering stability under a high load condition.

Moreover, as shown in FIG. 8, the bead reinforcing layer 9 comprises an outer portion 9a extending along the axial outer surface of the turn-up portion 6b of the carcass ply 6A, and a bottom portion 9b connecting with this outer portion 9a and extending along the radially inner surface 5a of the bead core 5. The bead reinforcing layer 9 is substantially L-shaped in cross section.

The bead reinforcing layer 9 may reduce the weight of the tire 1 more than a traditional bead reinforcing layer having a substantially U-shape that also comprises an inner portion extending outwardly in the radial direction of the tire along the main portion 6a of the carcass ply 6A. In the state of the tire mounted on the standard rim R, the above-mentioned bottom portion 9b lies between the bead core 5 and the rim sheet Rs, and the bending rigidity of bead portion 4 can be increased in the absence of such an inner piece. And, the bottom portion 9b extends along the radially inner surface 5a of the bead core 5 so as to increase the fitting pressure with the standard rim R uniformly.

Meanwhile, since the conventional tire provided with the substantially L-shaped bead reinforcing layer 9 in cross section is liable to have a low fitting pressure on the side of the bead toe 4t, the bead core 5 tends to rotate with the tensile force of the carcass ply which pulls the bottom portion 9b of the bead reinforcing layer 9.

In the present embodiment, since the rotation of the bead core 5 is prevented, the rotation of the bead reinforcing layer 9 can be effectively prevented.

Moreover, in the present embodiment, an axial distance L1 between the axial inner end 9bi of the bottom portion 9b of the bead reinforcing layer 9 and the bead heal point 4h is in a range of from 10 to 25 mm under the unloaded standard condition.

Therefore, the bottom portion 9b of the bead reinforcing layer 9 is, also while traveling, disposed on the side of the bead heal point 4h where the bottom surface 4a of the bead portion 4 contacts stably with the rim sheet surface 13 of the standard rim R in a large fitting pressure, and the rotation can be prevented. And, the bead reinforcing layer 9 may effectively enhance the bending rigidity of bead portion 4, and the bead durability can be considerably improved.

When a distance L1 between the inner end 9bi of the bottom portion 9b of the bead reinforcing layer 9 and the bead heal point 4h is less than 10 mm, it may be difficult to sufficiently hold the bottom portion 9b between the bead core 5 and the standard rim R, and the bead durability may possibly not be maintained sufficiently. When the distance L1 is over 25 mm, the bottom portion 9b tends to be pulled with the tensile force of the carcass ply 6A, and thereby the bead durability may possibly not be maintained sufficiently. From the viewpoint of this, the distance L1 is preferably not less than 15 mm, more preferably not more than 20 mm.

When a height H4 of the outer portion 9a from the bead base line BL is large, a compression stress acting on the outer end 9 at of the outer piece 9a due to the tire deformation during traveling tends to increase, and a damage arising from this outer end 9 at. Moreover, when the height H4 is small, the bead portion 4 may possibly not be reinforced sufficiently. From the viewpoint of this, the height H4 is preferably not less than 0.12 times, more preferably not less than 0.15 times; and preferably not more than 0.25 times; more preferably not more than 0.20 times the tire section height H0.

When the complex modulus $E^*2$ of the topping rubber 17 of the bead reinforcing layer 9 is small, the bead portion 4 may not possibly be reinforced. When the complex modulus $E^*2$ is large, the rigidity of the bead portion 4 excessively increases, and the ride comfort may decrease. From the viewpoint of this, the complex modulus $E^*2$ is preferably not less than 7 MPa, more preferably not less than 8 MPa; and preferably not more than 11 MPa, more preferably not more than 10 MPa.

Similarly, a product of a cord strength F (N) of the bead reinforce cord 16 and an ends E (cord number/cm) of the bead reinforce cord 16 is preferably not less than 20000, more preferably not less than 23000; and not more than preferably 30000, more preferably not more than 27000.

Moreover, the above-mentioned angle θ3 of the bead reinforce cord 16 is preferably not less than 22 degrees, more preferably not more than 28 degrees.

Although the especially preferred embodiments of the present invention have been described in detail, needless to say, the invention is not limited to the above-mentioned concrete embodiments, and various modifications can be made.

EXAMPLE 1

A heavy-duty pneumatic tire having a basic structure shown in FIG. 1 and comprising a bead core and a bead apex rubber each having a specification shown in Table 1 was manufactured, and its property were tested.

The common specifications were as follows:
Tire size: 11R22.5
Rim size: 7.50×22.5
Rim flange height H2: 12.7 mm
Tire section height H0: 240 mm
Angle θr of rim sheet surface of standard rim with respect to tire axial direction: 15 degrees
Angle θ4 of bladder contact surface: 25 degrees
Complex modulus E*3 of wrapping rubber: 9 MPa
Test method was as follows.

<Rolling Resistance Property>

A rolling resistance was measured by use of a rolling resistance tester under the following condition. Evaluation was displayed using indices with Reference Example 1 being 100. The smaller the numeric value was, the smaller the rolling resistance property was; and the more favorable it was.
Internal pressure: 800 kPa
Load: 29.42 kN
velocity: 80 km/h <Bead Durability 1>

By use of the drum tester, each of the test tires was mounted on the above-mentioned rim and inflated to an internal pressure of 800 kPa and ran at the speed of 30 km/h under a condition of load 88.26 kN. A driving time until damage arisen in its bead portion was measured. Evaluation was displayed using indices with Reference Example 1 being 100. The larger the numeric value was, and the more favorable the durability was.

<Bead Durability 2>

After heating the rim flange of the above-mentioned rim to 130 degrees C., each of the test tires was mounted on the rim, and evaluated in the same way of the above-mentioned Bead Durability 1. The test result is shown in Table 1.

TABLE 1

|  | Ex. 1 | Ex. 2 | Ex. 3 | Ref. Ex. 1 | Ref. Ex. 2 | Ex. 4 | Ex. 5 | Ex. 6 | Ex. 7 | Ex. 8 |
|---|---|---|---|---|---|---|---|---|---|---|
| Angle θ1 in unloaded standard condition [degree] | 0 | 3 | −3 | 5 | −5 | 0 | 0 | 0 | 0 | 0 |
| Angle θ1 in loaded standard condition [degree] | 0 | 3 | −3 | 10 | 0 | 0 | 0 | 0 | 0 | 0 |
| Height H1 of center of gravity of bead core [mm] | 7.6 | 7.6 | 7.6 | 7.6 | 7.6 | 2.5 | 5.1 | 10.8 | 12.7 | 7.6 |
| Ratio (H1/H2) | 0.60 | 0.60 | 0.60 | 0.60 | 0.60 | 0.20 | 0.40 | 0.85 | 1.00 | 0.60 |
| Bead core maximum width CW [mm] | 16 | 16 | 16 | 16 | 16 | 16 | 16 | 16 | 16 | 16 |
| Bead core maximum thickness AW [mm] | 9 | 9 | 9 | 9 | 9 | 9 | 9 | 9 | 9 | 1.6 |
| Ratio (AW/CW) | 0.56 | 0.56 | 0.56 | 0.56 | 0.56 | 0.56 | 0.56 | 0.56 | 0.56 | 0.10 |
| Distance H of bead core from inner end to bead-heal point [mm] | 20 | 20 | 20 | 20 | 20 | 20 | 20 | 20 | 20 | 20 |
| Bead bottom width G [mm] | 25 | 25 | 25 | 25 | 25 | 25 | 25 | 25 | 25 | 25 |
| Ratio (H/G) | 0.80 | 0.80 | 0.80 | 0.80 | 0.80 | 0.80 | 0.80 | 0.80 | 0.80 | 0.80 |
| Ratio (CW/G) | 0.64 | 0.64 | 0.64 | 0.64 | 0.64 | 0.64 | 0.64 | 0.64 | 0.64 | 0.64 |
| Bead apex rubber complex modulus E*1 [Mpa] | 70 | 70 | 70 | 70 | 70 | 70 | 70 | 70 | 70 | 70 |
| Bead apex rubber length H3 [mm] | 75 | 75 | 75 | 75 | 75 | 75 | 75 | 75 | 75 | 75 |
| Ratio (H3/H0) | 0.31 | 0.31 | 0.31 | 0.31 | 0.31 | 0.31 | 0.31 | 0.31 | 0.31 | 0.31 |
| Angle θc of bead core when tire is inflated to 5% of regular internal pressure [degree] | 20 | 23 | 17 | 25 | 15 | 20 | 20 | 20 | 20 | 20 |
| θc-θr [degree] | 5 | 8 | 2 | 10 | 0 | 5 | 5 | 5 | 5 | 5 |
| Angle θa between inner surface of bead core and inside bead bottom of bead portion [degree] | 5 | 2 | 8 | 0 | 10 | 5 | 5 | 5 | 5 | 5 |
| Rolling resistance property (index) (Smaller is better.) | 90 | 95 | 95 | 100 | 100 | 95 | 95 | 97 | 100 | 105 |
| Bead durability 1 (index) (Larger is better.) | 150 | 130 | 140 | 100 | 105 | 90 | 110 | 110 | 110 | 110 |
| Bead durability 2 (index) (Larger is better.) | 150 | 120 | 140 | 100 | 105 | 90 | 110 | 110 | 105 | 105 |

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Angle θ1 in unloaded standard condition [degree] | 0 | 0 | 0 | 0 | 0 | 0 | 0 | 0 | 0 | 0 |
| Angle θ1 in loaded standard condition [degree] | 0 | 0 | 0 | 0 | 0 | 0 | 0 | 0 | 0 | 0 |
| Height H1 of center of gravity of bead core [mm] | 7.6 | 7.6 | 7.6 | 7.6 | 7.6 | 7.6 | 7.6 | 7.6 | 7.6 | 7.6 |
| Ratio (H1/H2) | 0.60 | 0.60 | 0.60 | 0.60 | 0.60 | 0.60 | 0.60 | 0.60 | 0.60 | 0.60 |
| Bead core maximum width CW [mm] | 16 | 16 | 16 | 16 | 16 | 16 | 16 | 12.5 | 15 | 21.3 |
| Bead core maximum thickness AW [mm] | 3.2 | 11.2 | 14.4 | 9 | 9 | 9 | 9 | 9 | 9 | 9 |
| Ratio (AW/CW) | 0.20 | 0.70 | 0.90 | 0.56 | 0.56 | 0.56 | 0.56 | 0.72 | 0.60 | 0.41 |
| Distance H of bead core from inner end to bead-heal point [mm] | 20 | 20 | 20 | 12.5 | 15 | 23.5 | 24.5 | 20 | 20 | 20 |
| Bead bottom width G [mm] | 25 | 25 | 25 | 25 | 25 | 25 | 25 | 25 | 25 | 25 |

TABLE 1-continued

|  |  |  |  |  |  |  |  |  |  |  |
|---|---|---|---|---|---|---|---|---|---|---|
| Ratio (H/G) | 0.80 | 0.80 | 0.80 | 0.50 | 0.60 | 0.94 | 0.98 | 0.80 | 0.80 | 0.80 |
| Ratio (CW/G) | 0.64 | 0.64 | 0.64 | 0.64 | 0.64 | 0.64 | 0.64 | 0.50 | 0.60 | 0.85 |
| Bead apex rubber complex modulus E*1 [Mpa] | 70 | 70 | 70 | 70 | 70 | 70 | 70 | 70 | 70 | 70 |
| Bead apex rubber length H3 [mm] | 75 | 75 | 75 | 75 | 75 | 75 | 75 | 75 | 75 | 75 |
| Ratio (H3/H0) | 0.31 | 0.31 | 0.31 | 0.31 | 0.31 | 0.31 | 0.31 | 0.31 | 0.31 | 0.31 |
| Angle θc of bead core when tire is inflated to 5% of regular internal pressure [degree] | 20 | 20 | 20 | 20 | 20 | 20 | 20 | 20 | 20 | 20 |
| θc-θr [degree] | 5 | 5 | 5 | 5 | 5 | 5 | 5 | 5 | 5 | 5 |
| Angle θa between inner surface of bead core and inside bead bottom of bead portion [degree] | 5 | 5 | 5 | 5 | 5 | 5 | 5 | 5 | 5 | 5 |
| Rolling resistance property (index) (Smaller is better.) | 105 | 95 | 95 | 100 | 95 | 95 | 100 | 97 | 95 | 90 |
| Bead durability 1 (index) (Larger is better.) | 110 | 130 | 120 | 110 | 130 | 130 | 110 | 120 | 130 | 130 |
| Bead durability 2 (index) (Larger is better.) | 110 | 130 | 120 | 110 | 130 | 130 | 110 | 120 | 130 | 130 |

|  | Ex. 19 | Ex. 20 | Ex. 21 | Ex. 22 | Ex. 23 | Ex. 24 | Ex. 25 | Ex. 26 | Ref. Ex. 3 |
|---|---|---|---|---|---|---|---|---|---|
| Angle θ1 in unloaded standard condition [degree] | 0 | 0 | 0 | 0 | 0 | 0 | 3 | −3 | 5 |
| Angle θ1 in loaded standard condition [degree] | 0 | 0 | 0 | 0 | 0 | 0 | 3 | −3 | 10 |
| Height H1 of center of gravity of bead core [mm] | 7.6 | 7.6 | 7.6 | 7.6 | 7.6 | 7.6 | 7.6 | 7.6 | 7.6 |
| Ratio (H1/H2) | 0.60 | 0.60 | 0.60 | 0.60 | 0.60 | 0.60 | 0.60 | 0.60 | 0.60 |
| Bead core maximum width CW [mm] | 22.5 | 16 | 16 | 16 | 16 | 19.5 | 19.5 | 19.5 | 22.3 |
| Bead core maximum thickness AW [mm] | 9 | 9 | 9 | 9 | 9 | 11.1 | 11.1 | 11.1 | 9.1 |
| Ratio (AW/CW) | 0.40 | 0.56 | 0.56 | 0.56 | 0.56 | 0.57 | 0.57 | 0.57 | 0.41 |
| Distance H of bead core from inner end to bead-heal point [mm] | 20 | 20 | 20 | 20 | 20 | 21.8 | 21.8 | 21.8 | 22.3 |
| Bead bottom width G [mm] | 25 | 25 | 25 | 25 | 25 | 25 | 25 | 25 | 25 |
| Ratio (H/G) | 0.80 | 0.80 | 0.80 | 0.80 | 0.80 | 0.87 | 0.87 | 0.87 | 0.89 |
| Ratio (CW/G) | 0.90 | 0.64 | 0.64 | 0.64 | 0.64 | 0.78 | 0.78 | 0.78 | 0.89 |
| Bead apex rubber complex modulus E*1 [Mpa] | 70 | 40 | 100 | 70 | 70 | 70 | 70 | 70 | 70 |
| Bead apex rubber length H3 [mm] | 75 | 75 | 75 | 36 | 144 | 75 | 75 | 75 | 75 |
| Ratio (H3/H0) | 0.31 | 0.31 | 0.31 | 0.15 | 0.60 | 0.31 | 0.31 | 0.31 | 0.31 |
| Angle θc of bead core when tire is inflated to 5% of regular internal pressure [degree] | 20 | 20 | 20 | 20 | 20 | 20 | 20 | 20 | 20 |
| θc-θr [degree] | 5 | 5 | 5 | 5 | 5 | 5 | 5 | 5 | 5 |
| Angle θa between inner surface of bead core and inside bead bottom of bead portion [degree] | 5 | 5 | 5 | 5 | 5 | 5 | 5 | 5 | 5 |
| Rolling resistance property (index) (Smaller is better.) | 90 | 95 | 90 | 95 | 90 | 90 | 95 | 95 | 100 |
| Bead durability 1 (index) (Larger is better.) | 120 | 110 | 90 | 90 | 100 | 150 | 130 | 140 | 90 |
| Bead durability 2 (index) (Larger is better.) | 120 | 110 | 95 | 95 | 100 | 150 | 130 | 140 | 90 |

For the test result, it was confirmed that the heavy-duty pneumatic tire of Examples could improve the bead durability and the rolling resistance property.

EXAMPLE 2

A heavy-duty pneumatic tire having the basic structure shown in FIG. 1 and comprising the bead core, the bead reinforcing layer, and the bead apex rubber each having a specification shown in FIG. 8 and Table 2 was manufactured and its property were tested.

The common specifications were as follows:
Tire size: 11R22.5
Rim size: 7.50×22.5
Rim flange height H2: 12.7 mm
Tire section height H0: 240 mm
Angle θr of rim sheet surface of standard rim with respect to tire axial direction: 15 degrees
Angle θ4 of bladder contact surface: 25 degrees
Complex modulus E*3 of wrapping rubber: 9 MPa
Test method was as follows.
<Bead Durability 1>
By use of the drum tester, each of the test tires was mounted on the above-mentioned rim and inflated to the internal pressure of 800 kPa and ran at the speed of 30 km/h under a condition of load 88.26 kN. A driving time until a damage arisen in its bead portion was measured. Evaluation was displayed using indices with Reference Example 1 being 100. The larger the numeric value was, and the more favorable the durability was.
<Bead Durability 2>
After heating the rim flange of the above-mentioned rim to 130 degrees C., each of the test tires was mounted on the rim, and evaluated in the same way of the above-mentioned Bead Durability 1.
<Ride Comfort>
Each of the test tires was mounted on the above-mentioned rim of the above-mentioned vehicle under the above-mentioned condition, and ran on an asphalt uneven road, a Belgian road, and a bitzman road, respectively. A professional driver comprehensively evaluated a lumpy feeling, upthrust, and dumping on his/her senses. Evaluation was displayed using indices with Example 1 being 100. The larger the numeric value was, and the more favorable it was.
<Rolling Resistance Property>
The rolling resistance was measured by use of the rolling resistance tester under the following condition. Evaluation was displayed using indices with Example 1 being 100. The smaller the numeric value was, the smaller the rolling resistance property was; and the more favorable it was.

Internal pressure: 800 kPa
Load: 29.42 kN
velocity: 80 km/h
Test result was shown in Table 2.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ref. Ex. 1 | Ref. Ex. 2 | Ex. 12 | Ex. 13 |
|---|---|---|---|---|---|---|---|---|---|---|---|---|---|---|---|
| Distance L1 between inner end of bottom piece of bead reinforcing layer and bead heal point [mm] | 18 | 10 | 25 | 18 | 18 | 18 | 18 | 18 | 18 | 18 | 18 | 5 | 30 | 18 | 18 |
| Height H4 of outer piece [mm] | 48 | 48 | 48 | 29 | 60 | 48 | 48 | 48 | 48 | 48 | 48 | 48 | 48 | 24 | 72 |
| Ratio (H4/H0) | 0.20 | 0.20 | 0.20 | 0.12 | 0.25 | 0.20 | 0.20 | 0.20 | 0.20 | 0.20 | 0.20 | 0.20 | 0.20 | 0.10 | 0.30 |
| Angle θ3 of bead reinforce cord [degree] | 25 | 25 | 25 | 25 | 25 | 20 | 30 | 25 | 25 | 25 | 25 | 25 | 25 | 25 | 25 |
| Cord force F of bead reinforce cord [N] | 500 | 500 | 500 | 500 | 500 | 500 | 500 | 500 | 500 | 500 | 500 | 500 | 500 | 500 | 500 |
| Ends E of bead reinforcing layer [cord number/cm] | 50 | 50 | 50 | 50 | 50 | 50 | 50 | 40 | 60 | 50 | 50 | 50 | 50 | 50 | 50 |
| Product (F · E) | 25000 | 25000 | 25000 | 25000 | 25000 | 25000 | 25000 | 20000 | 30000 | 25000 | 25000 | 25000 | 25000 | 25000 | 25000 |
| Complex modulus E*2 of topping rubber of bead reinforcing layer [Mpa] | 9 | 9 | 9 | 9 | 9 | 9 | 9 | 9 | 9 | 7 | 11 | 9 | 9 | 9 | 9 |
| Angle θ1 in unloaded standard condition [degree] | 0 | 0 | 0 | 0 | 0 | 0 | 0 | 0 | 0 | 0 | 0 | 0 | 0 | 0 | 0 |
| Angle θ1 in loaded standard condition [degree] | 0 | 0 | 0 | 0 | 0 | 0 | 0 | 0 | 0 | 0 | 0 | 0 | 0 | 0 | 0 |
| Height H1 of center of gravity of bead core [mm] | 7.6 | 7.6 | 7.6 | 7.6 | 7.6 | 7.6 | 7.6 | 7.6 | 7.6 | 7.6 | 7.6 | 7.6 | 7.6 | 7.6 | 7.6 |
| Ratio (H1/H2) | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| Bead core maximum width CW [mm] | 16 | 16 | 16 | 16 | 16 | 16 | 16 | 16 | 16 | 16 | 16 | 16 | 16 | 16 | 16 |
| Bead core maximum thickness AW [mm] | 9 | 9 | 9 | 9 | 9 | 9 | 9 | 9 | 9 | 9 | 9 | 9 | 9 | 9 | 9 |
| Ratio (AW/CW) | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| Distance H of bead core from inner end to bead-heal point [mm] | 20 | 20 | 20 | 20 | 20 | 20 | 20 | 20 | 20 | 20 | 20 | 20 | 20 | 20 | 20 |
| Bead bottom width G [mm] | 25 | 25 | 25 | 25 | 25 | 25 | 25 | 25 | 25 | 25 | 25 | 25 | 25 | 25 | 25 |
| Ratio (H/G) | 0.80 | 0.80 | 0.80 | 0.80 | 0.80 | 0.80 | 0.80 | 0.80 | 0.80 | 0.80 | 0.80 | 0.80 | 0.80 | 0.80 | 0.80 |
| Ratio (CW/G) | 0.64 | 0.64 | 0.64 | 0.64 | 0.64 | 0.64 | 0.64 | 0.64 | 0.64 | 0.64 | 0.64 | 0.64 | 0.64 | 0.64 | 0.64 |
| Bead apex rubber complex modulus E*1 [Mpa] | 70 | 70 | 70 | 70 | 70 | 70 | 70 | 70 | 70 | 70 | 70 | 70 | 70 | 70 | 70 |
| Bead apex rubber length H3 [mm] | 75 | 75 | 75 | 75 | 75 | 75 | 75 | 75 | 75 | 75 | 75 | 75 | 75 | 75 | 75 |
| Ratio (H3/H0) | 0.31 | 0.31 | 0.31 | 0.31 | 0.31 | 0.31 | 0.31 | 0.31 | 0.31 | 0.31 | 0.31 | 0.31 | 0.31 | 0.31 | 0.31 |
| Angle θc of bead core when tire is inflated to 5% of regular internal pressure [degree] | 20 | 20 | 20 | 20 | 20 | 20 | 20 | 20 | 20 | 20 | 20 | 20 | 20 | 20 | 20 |
| θc-θr [degree] | 5 | 5 | 5 | 5 | 5 | 5 | 5 | 5 | 5 | 5 | 5 | 5 | 5 | 5 | 5 |
| Angle θa between inner surface of bead core and inside bead bottom of bead portion [degree] | 5 | 5 | 5 | 5 | 5 | 5 | 5 | 5 | 5 | 5 | 5 | 5 | 5 | 5 | 5 |
| Bead durability 1 (index) (Larger is better.) | 100 | 90 | 90 | 100 | 90 | 90 | 110 | 90 | 110 | 90 | 110 | 40 | 40 | 100 | 60 |
| Bead durability 2 (index) | 100 | 90 | 90 | 90 | 100 | 90 | 110 | 90 | 110 | 90 | 110 | 40 | 40 | 60 | 100 |

TABLE 2-continued

| | Ex. 14 | Ex. 15 | Ex. 16 | Ex. 17 | Ex. 18 | Ex. 19 | Ex. 20 | Ex. 21 | Ref. Ex. 3 | Ref. Ex. 4 | Ex. 22 | Ex. 23 | Ex. 24 | Ex. 25 | Ex. 26 |
|---|---|---|---|---|---|---|---|---|---|---|---|---|---|---|---|
| Ride comfort (index) (Larger is better.) | 100 | 100 | 100 | 100 | 100 | 100 | 90 | 100 | 90 | 100 | 90 | 100 | 100 | 100 | 100 |
| Rolling resistance property (index) (Smaller is better.) | 100 | 100 | 100 | 100 | 100 | 100 | 100 | 102 | 98 | 100 | 100 | 100 | 100 | 100 | 100 |
| Distance L1 between inner end of bottom piece of bead reinforcing layer and bead heel point [mm] | 18 | 18 | 18 | 18 | 18 | 18 | 18 | 18 | 18 | 18 | 18 | 18 | 18 | 18 | 18 |
| Height H4 of outer piece [mm] | 48 | 48 | 48 | 48 | 48 | 48 | 48 | 48 | 48 | 48 | 48 | 48 | 48 | 48 | 48 |
| Ratio (H4/H0) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Angle θ3 of bead reinforce cord [degree] | 15 | 35 | 25 | 25 | 25 | 25 | 25 | 25 | 25 | 25 | 25 | 25 | 25 | 25 | 25 |
| Cord force F of bead reinforce cord [N] | 500 | 500 | 500 | 700 | 500 | 500 | 500 | 500 | 500 | 500 | 500 | 500 | 500 | 500 | 500 |
| Ends E of bead reinforcing layer [cord number/cm] | 50 | 50 | 30 | 50 | 50 | 50 | 50 | 50 | 50 | 50 | 50 | 50 | 50 | 50 | 50 |
| Product (F · E) | 25000 | 25000 | 15000 | 35000 | 25000 | 25000 | 25000 | 25000 | 25000 | 25000 | 25000 | 25000 | 25000 | 25000 | 25000 |
| Complex modulus E*2 of topping rubber of bead reinforcing layer [Mpa] | 9 | 9 | 9 | 9 | 5 | 13 | 9 | 9 | 9 | 9 | 9 | 9 | 9 | 9 | 9 |
| Angle θ1 in unloaded standard condition [degree] | 0 | 0 | 0 | 0 | 0 | 0 | 3 | −3 | 5 | −5 | 0 | 0 | 0 | 0 | 0 |
| Angle θ1 in loaded standard condition [degree] | 0 | 0 | 0 | 0 | 0 | 0 | 3 | −3 | 10 | 0 | 0 | 0 | 0 | 0 | 0 |
| Height H1 of center of gravity of bead core [mm] | 7.6 | 7.6 | 7.6 | 7.6 | 7.6 | 7.6 | 7.6 | 7.6 | 7.6 | 7.6 | 5.1 | 10.8 | 7.6 | 7.6 | 7.6 |
| Ratio (H1/H2) | 0.60 | 0.60 | 0.60 | 0.60 | 0.60 | 0.60 | 0.60 | 0.60 | 0.60 | 0.60 | 0.40 | 0.85 | 0.60 | 0.60 | 0.60 |
| Bead core maximum width CW [mm] | 16 | 16 | 16 | 16 | 16 | 16 | 16 | 16 | 16 | 16 | 16 | 16 | 16 | 16 | 16 |
| Bead core maximum thickness AW [mm] | 9 | 9 | 9 | 9 | 9 | 9 | 9 | 9 | 9 | 9 | 9 | 9 | 3.2 | 11 | 9 |
| Ratio (AW/CW) | 0.56 | 0.56 | 0.56 | 0.56 | 0.56 | 0.56 | 0.56 | 0.56 | 0.56 | 0.56 | 0.56 | 0.56 | 0.2 | 0.69 | 0.56 |
| Distance H of bead core from inner end to bead-heel point [mm] | 20 | 20 | 20 | 20 | 20 | 20 | 20 | 20 | 20 | 20 | 20 | 20 | 20 | 20 | 15 |
| Bead bottom width G [mm] | 25 | 25 | 25 | 25 | 25 | 25 | 25 | 25 | 25 | 25 | 25 | 25 | 25 | 25 | 25 |
| Ratio (H/G) | 0.80 | 0.80 | 0.80 | 0.80 | 0.80 | 0.80 | 0.80 | 0.80 | 0.80 | 0.80 | 0.80 | 0.80 | 0.80 | 0.80 | 0.60 |
| Ratio (CW/G) | 0.64 | 0.64 | 0.64 | 0.64 | 0.64 | 0.64 | 0.64 | 0.64 | 0.64 | 0.64 | 0.64 | 0.64 | 0.64 | 0.64 | 0.64 |
| Bead apex rubber complex modulus E*1 [Mpa] | 70 | 70 | 70 | 70 | 70 | 70 | 70 | 70 | 70 | 70 | 70 | 70 | 70 | 70 | 70 |
| Bead apex rubber length H3 [mm] | 75 | 75 | 75 | 75 | 75 | 75 | 75 | 75 | 75 | 75 | 75 | 75 | 75 | 75 | 75 |
| Ratio (H3/H0) | 0.31 | 0.31 | 0.31 | 0.31 | 0.31 | 0.31 | 0.31 | 0.31 | 0.31 | 0.31 | 0.31 | 0.31 | 0.31 | 0.31 | 0.31 |
| Angle θc of bead core when tire is inflated to 5% of regular internal pressure [degree] | 20 | 20 | 20 | 20 | 20 | 20 | 23 | 17 | 25 | 15 | 20 | 20 | 20 | 20 | 20 |
| θc−θr [degree] | 5 | 5 | 5 | 5 | 5 | 5 | 8 | 2 | 10 | 0 | 5 | 5 | 5 | 5 | 5 |
| Angle θa between inner surface of bead core and inside bead bottom of bead portion [degree] | 5 | 5 | 5 | 5 | 5 | 5 | 2 | 8 | 0 | 10 | 5 | 5 | 5 | 5 | 5 |
| Bead durability 1 (index) | 60 | 100 | 60 | 100 | 60 | 100 | 70 | 70 | 30 | 30 | 70 | 70 | 70 | 70 | 60 |

TABLE 2-continued

| | | | | | | | | |
|---|---|---|---|---|---|---|---|---|
| (Larger is better.) Bead durability 2 (index) | 60 | 60 | 70 | 70 | 30 | 70 | 70 | 60 |
| (Larger is better.) Ride comfort (index) | 100 | 100 | 100 | 100 | 100 | 100 | 90 | 90 |
| (Larger is better.) Rolling resistance property (index) (Smaller is better.) | 100 | 60 | 60 | 100 | 100 | 90 | 90 | 100 |
| | 103 | 100 | 97 | 100 | 102 | 105 | 102 | 102 |

| | Ex. 27 | Ex. 28 | Ex. 29 | Ex. 30 | Ex. 31 | Ex. 32 | Ex. 33 |
|---|---|---|---|---|---|---|---|
| Distance L1 between inner end of bottom piece of bead reinforcing layer and bead heal point [mm] | 18 | 18 | 18 | 18 | 18 | 18 | 18 |
| Height H4 of outer piece [mm] | 48 | 48 | 48 | 48 | 48 | 48 | 48 |
| Ratio (H4/H0) | 0.20 | 0.20 | 0.20 | 0.20 | 0.20 | 0.20 | 0.20 |
| Angle θ3 of bead reinforce cord [degree] | 25 | 25 | 25 | 25 | 25 | 25 | 25 |
| Cord force F of bead reinforce cord [N] | 500 | 500 | 500 | 500 | 500 | 500 | 500 |
| Ends E of bead reinforcing layer [cord number/cm] | 50 | 50 | 50 | 50 | 50 | 50 | 50 |
| Product (F · E) | 25000 | 25000 | 25000 | 25000 | 25000 | 25000 | 25000 |
| Complex modulus E*2 of topping rubber of bead reinforcing layer [Mpa] | 9 | 9 | 9 | 9 | 9 | 9 | 9 |
| Angle θ1 in unloaded standard condition [degree] | 0 | 0 | 0 | 0 | 0 | 0 | 0 |
| Angle θ1 in loaded standard condition [degree] | 0 | 0 | 0 | 0 | 0 | 0 | 0 |
| Height H1 of center of gravity of bead core [mm] | 7.6 | 7.6 | 7.6 | 7.6 | 7.6 | 7.6 | 7.6 |
| Ratio (H1/H2) | 0.60 | 0.60 | 0.60 | 0.60 | 0.60 | 0.60 | 0.60 |
| Bead core maximum width CW [mm] | 16 | 14 | 16 | 16 | 16 | 16 | 16 |
| Bead core maximum thickness AW [mm] | 9 | 9 | 9 | 9 | 9 | 9 | 9 |
| Ratio (AW/CW) | 0.56 | 0.64 | 0.56 | 0.56 | 0.56 | 0.56 | 0.56 |
| Distance H of bead core from inner end to bead-heal point [mm] | 20 | 20 | 20 | 20 | 20 | 20 | 20 |
| Bead bottom width G [mm] | 21 | 28 | 19 | 25 | 25 | 25 | 25 |
| Ratio (H/G) | 0.95 | 0.71 | 1.05 | 0.80 | 0.80 | 0.80 | 0.80 |
| Ratio (CW/G) | 0.76 | 0.5 | 0.84 | 0.64 | 0.64 | 0.64 | 0.64 |
| Bead apex rubber complex modulus E*1 [Mpa] | 75 | 70 | 70 | 60 | 80 | 70 | 70 |
| Bead apex rubber length H3 [mm] | 75 | 75 | 75 | 75 | 75 | 48 | 120 |
| Ratio (H3/H0) | 0.31 | 0.31 | 0.31 | 0.31 | 0.31 | 0.2 | 0.5 |
| Angle θc of bead core when tire is inflated to 5% of regular internal pressure [degree] | 20 | 20 | 20 | 20 | 20 | 20 | 20 |
| θc-θr [degree] | 5 | 5 | 5 | 5 | 5 | 5 | 5 |
| Angle θa between inner surface of bead core and inside bead bottom of bead portion [degree] | 5 | 5 | 5 | 5 | 5 | 5 | 5 |
| Bead durability 1 (index) (Larger is better.) | 60 | 70 | 70 | 70 | 100 | 80 | 100 |
| Bead durability 2 (index) (Larger is better.) | 60 | 70 | 70 | 70 | 100 | 80 | 100 |
| Ride comfort (index) (Larger is better.) | 100 | 100 | 100 | 100 | 70 | 100 | 70 |
| Rolling resistance property (index) (Smaller is better.) | 102 | 102 | 102 | 102 | 100 | 102 | 100 |

For the test result, it was confirmed that the heavy-duty pneumatic tire of Examples could improve the bead durability and the rolling resistance property.

EXAMPLE 3

A heavy-duty pneumatic tire having the basic structure shown in FIG. 1 and comprising a wrapping rubber having a specification shown in Table 3 was manufactured, and its property were tested. This heavy-duty pneumatic tire was manufactured by use of a bead ring having a specification shown in FIGS. 7(a) and 7(b) and Table 3.

The common specifications are as follows:

Tire size: 11R22.5
Rim size: 7.50×22.5
Rim flange height H2: 12.7 mm
Tire section height H0: 240 mm
Angle θr of rim sheet surface of standard rim with respect to tire axial direction: 15 degrees
Angle θ1 in unloaded standard condition: 0 degrees
Angle θ1 in loaded standard condition: 0 degrees
Height H1 of center of gravity of bead core: 7.6 mm
Ratio (H1/H2): 0.60
Bead core maximum width CW: 16 mm
Bead core maximum thickness AW: 9 mm
Ratio (AW/CW): 0.56
Distance H of bead core from inner end to bead heal point: 20 mm
Bead bottom width G: 25 mm
Ratio (H/G): 0.80
Ratio (CW/G): 0.64
Bead apex rubber complex modulus E*1: 70 MPa
Bead apex rubber length H3: 75 mm
Ratio (H3/H0): 0.31
Angle θc of bead core when the tire is inflated to 5% of regular internal pressure: 20 degrees
θc−θr: 5 degrees
Angle θa between inner surface of bead core and inside bead bottom
of bead portion: 5 degrees
Test method was as follows.

<Bead Durability>
Each of the test tires was mounted on the above-mentioned rim, and water of 300 cc was poured into the tire cavity, and the tire was inflated to the internal pressure of 800 kPa. By use of the drum tester, the tire was ran under a condition of 3 times the regular load, and a driving time until damage arisen in its bead portion was measured. Evaluation was displayed using indices with Example 1 being 100. The larger the numeric value was, the more favorable it was.

<Air Stay Around Bead>
By use of each test bead ring, one hundred of test tires were manufactured, and a visual inspection detected an air stay around the bead. Evaluation was defined as the reciprocal of the numbers of the tire with air stay and displayed using indices with Example 1 being 100. The larger the numeric value was, the more favorable it was.

<Processability>
Each test wrapping rubber was wound around the bead core, and the presence of winding defect was checked. Evaluation was defined as the reciprocal of the numbers of the tire with winding defect and displayed using indices with Example 1 being 100. The larger the numeric value was, the more favorable it was.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|
| Angle θ4 of bladder contact surface [degree] | 0 | 10 | 20 | 25 | 35 | 40 | 50 | 70 | 30 | 30 | 30 | 30 | 30 | 30 | 30 | 30 |
| Complex modulus E*3 of wrapping rubber [Mpa] | 9 | 9 | 9 | 9 | 9 | 9 | 9 | 9 | 3 | 5 | 6 | 7 | 10 | 11 | 12 | 15 |
| Bead durability (index) (Larger is better.) | 90 | 95 | 100 | 100 | 100 | 100 | 100 | 100 | 90 | 95 | 100 | 100 | 100 | 100 | 100 | 100 |
| Air stay around bead (index) (Larger is better.) | 100 | 100 | 100 | 100 | 100 | 100 | 95 | 90 | 100 | 100 | 100 | 100 | 100 | 100 | 100 | 100 |
| Processability (index) (Larger is better.) | 100 | 100 | 100 | 100 | 100 | 100 | 100 | 100 | 100 | 100 | 100 | 100 | 100 | 100 | 90 | 80 |

For the test result, it was confirmed that, according to the invention, Example having the angle θ4 of the bladder contact surface and the complex modulus E3 of the wrapping rubber in the favorable ranges excelled in the bead durability, and could prevent from arising the air stay around the bead and from decreasing of processability.

The invention claimed is:

1. A wheel assembly comprising a heavy-duty pneumatic tire and a standard rim comprising
   a carcass comprising a carcass ply extending from a tread portion through a sidewall portion and turned up around a bead core of a bead portion, wherein
   said bead core has a cross section having a substantially hexagonal shape including a radially inner surface extending along a bottom surface of said bead portion, and
   under two conditions that include: an unloaded standard condition where the tire is mounted on the standard rim and inflated to a regular internal pressure; and a loaded standard condition where the tire in the unloaded standard condition is loaded with a regular load and grounded at a camber angle of 0 degrees; an angle between said radially inner surface of said bead core and a rim sheet surface of said standard rim is in a range of 0 plus/minus 3 degrees,
   wherein in a free condition of the tire that the tire is not mounted on the rim, an angle θa between the radially inner surface of the bead core and an inward portion under the bead core on the bottom surface of the bead portion is in a range of from 3 to 10 degrees.

2. The wheel assembly as set forth in claim 1, wherein
said hexagonal shape of said bead core has a center of gravity and a height from a bead base line to the center of gravity of said hexagonal shape of said bead core is in a range of from 0.40 to 0.85 times a height of a rim flange of the standard rim under the unloaded standard condition.

3. The wheel assembly as set forth in claim 1, wherein under the unloaded standard condition, said bead core has
   a maximum width CW measured in parallel with said rim sheet surface,
   a maximum thickness AW measured at right angles to the maximum width, and
   a ratio AW/CW of the maximum thickness to the maximum width of from 0.2 to 0.7.

4. The wheel assembly as set forth in claim 1, wherein said bead portion comprises a bead apex rubber extending and tapering outwardly in a radial direction of the tire from a radially outer surface of said bead core, and
   the bead apex rubber has a complex modulus E*1 in a range of from 60 to 80 MPa.

5. The wheel assembly as set forth in claim 1, wherein under the unloaded standard condition, a ratio H/G between a tire axial distance H from an axially inner end of the bead core to a bead heal point and a tire axial width G of the bottom surface of the bead portion is in a range of from 0.60 to 0.94.

6. The wheel assembly as set forth in claim 1, wherein under the unloaded standard condition, a ratio CW/G between a maximum width CW of the bead core and a tire axial width G of the bottom surface of the bead portion is in a range of from 0.50 to 0.85.

7. The wheel assembly as set forth in claim 1, wherein under an unloaded condition where the tire is mounted on the standard rim and inflated to 5% of the regular internal pressure,
   said radially inner surface of the bead core has an angle θc with respect to a tire axial-directional line being larger than an angle θr of said rim sheet surface with respect to a tire axial-directional line, and
   a difference between the angle θc and the angle θr is in a range of from 2 to 8 degrees.

8. The wheel assembly as set forth in claim 1, wherein a wrapping layer is provided around the bead core, and
   said wrapping layer is made of a rubber having a complex modulus E*3 of from 6 to 11 MPa.

9. The wheel assembly as set forth in claim 1, wherein said carcass ply includes a main portion extending from the tread portion through the sidewall portion to said bead core of the bead portion and a turn-up portion turned up around the bead core from the axially inside to the axially outside of the tire,
   said bead portion comprises a bead reinforcing layer having a substantially L-shaped cross-section which includes
      an outer portion extending along an axial outer surface of said turn-up portion of the carcass ply and
      a bottom portion extending along the radially inner surface of the bead core and having an axially inner end, and
      under the unloaded standard condition, the axially inner end of the bottom portion is located in a tire axial distance from a bead heal point of the bead portion in a range of from 10 to 25 mm.

10. The wheel assembly as set forth in claim 9, wherein under the unloaded standard condition, the outer portion has a radially outer end having a height from a bead base line of from 0.12 to 0.25 times a tire section height.

11. The wheel assembly as set forth in claim 2, wherein under the unloaded standard condition, said bead core has
    a maximum width CW measured in parallel with said rim sheet surface,
    a maximum thickness AW measured at right angles to the maximum width, and
    a ratio AW/CW of the maximum thickness to the maximum width of from 0.2 to 0.7.

12. The wheel assembly as set forth in claim 2, wherein said bead portion comprises a bead apex rubber extending and tapering outwardly in a radial direction of the tire from a radially outer surface of said bead core, and
    the bead apex rubber has a complex modulus E*1 in a range of from 60 to 80 MPa.

13. The wheel assembly as set forth in claim 3, wherein said bead portion comprises a bead apex rubber extending and tapering outwardly in a radial direction of the tire from a radially outer surface of said bead core, and
    the bead apex rubber has a complex modulus E*1 in a range of from 60 to 80 MPa.

14. The wheel assembly as set forth in claim 2, wherein under the unloaded standard condition, a ratio H/G between a tire axial distance H from an axially inner end of the bead core to a bead heal point and a tire axial width G of the bottom surface of the bead portion is in a range of from 0.60 to 0.94.

15. The wheel assembly as set forth in claim 3, wherein under the unloaded standard condition, a ratio H/G between a tire axial distance H from an axially inner end of the bead core to a bead heal point and a tire axial width G of the bottom surface of the bead portion is in a range of from 0.60 to 0.94.

16. The wheel assembly as set forth in claim 4, wherein under the unloaded standard condition, a ratio H/G between a tire axial distance H from an axially inner end of the bead core to a bead heal point and a tire axial width G of the bottom surface of the bead portion is in a range of from 0.60 to 0.94.

17. The wheel assembly as set forth in claim 2, wherein under the unloaded standard condition, a ratio CW/G between a maximum width CW of the bead core and a tire axial width G of the bottom surface of the bead portion is in a range of from 0.50 to 0.85.

18. The wheel assembly as set forth in claim 3, wherein under the unloaded standard condition, a ratio CW/G between a maximum width CW of the bead core and a tire axial width G of the bottom surface of the bead portion is in a range of from 0.50 to 0.85.

19. The wheel assembly as set forth in claim 4, wherein under the unloaded standard condition, a ratio CW/G between a maximum width CW of the bead core and a tire axial width G of the bottom surface of the bead portion is in a range of from 0.50 to 0.85.

20. The wheel assembly as set forth in claim 5, wherein under the unloaded standard condition, a ratio CW/G between a maximum width CW of the bead core and a tire axial width G of the bottom surface of the bead portion is in a range of from 0.50 to 0.85.

* * * * *